Dec. 28, 1965   C. B. PERRY ETAL   3,225,439
MACHINE TOOL CONTROL
Filed May 29, 1962   8 Sheets-Sheet 4
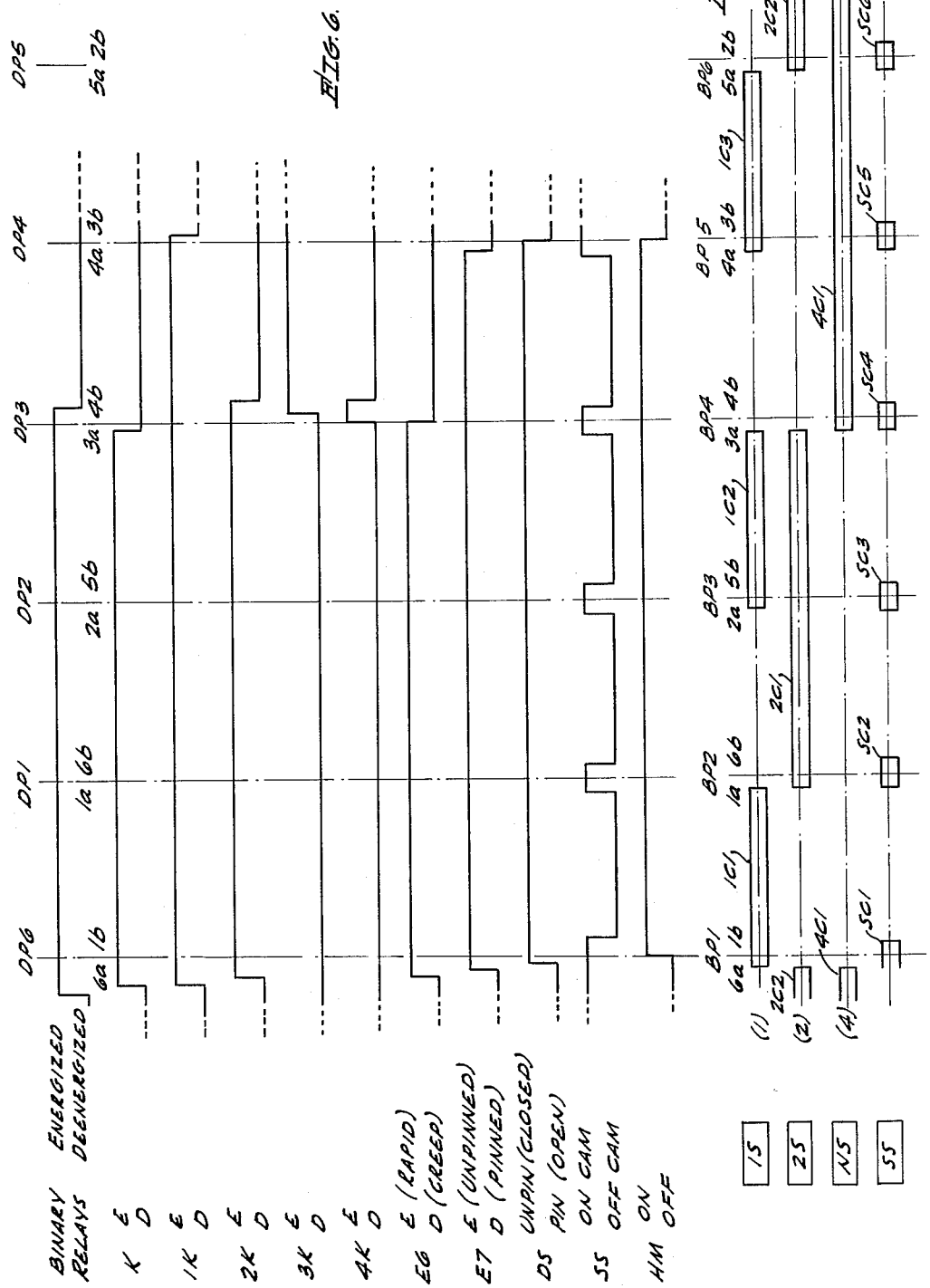

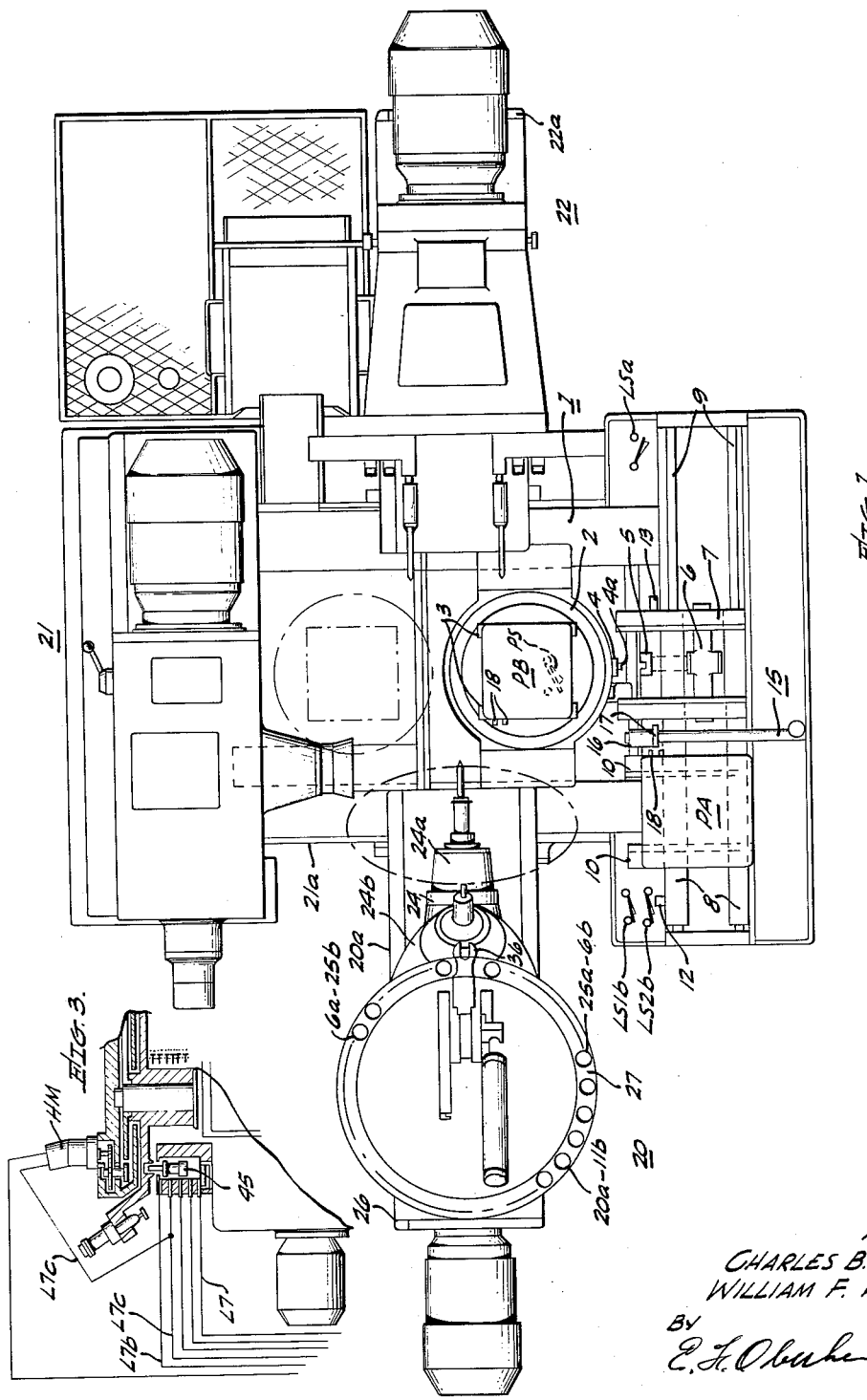

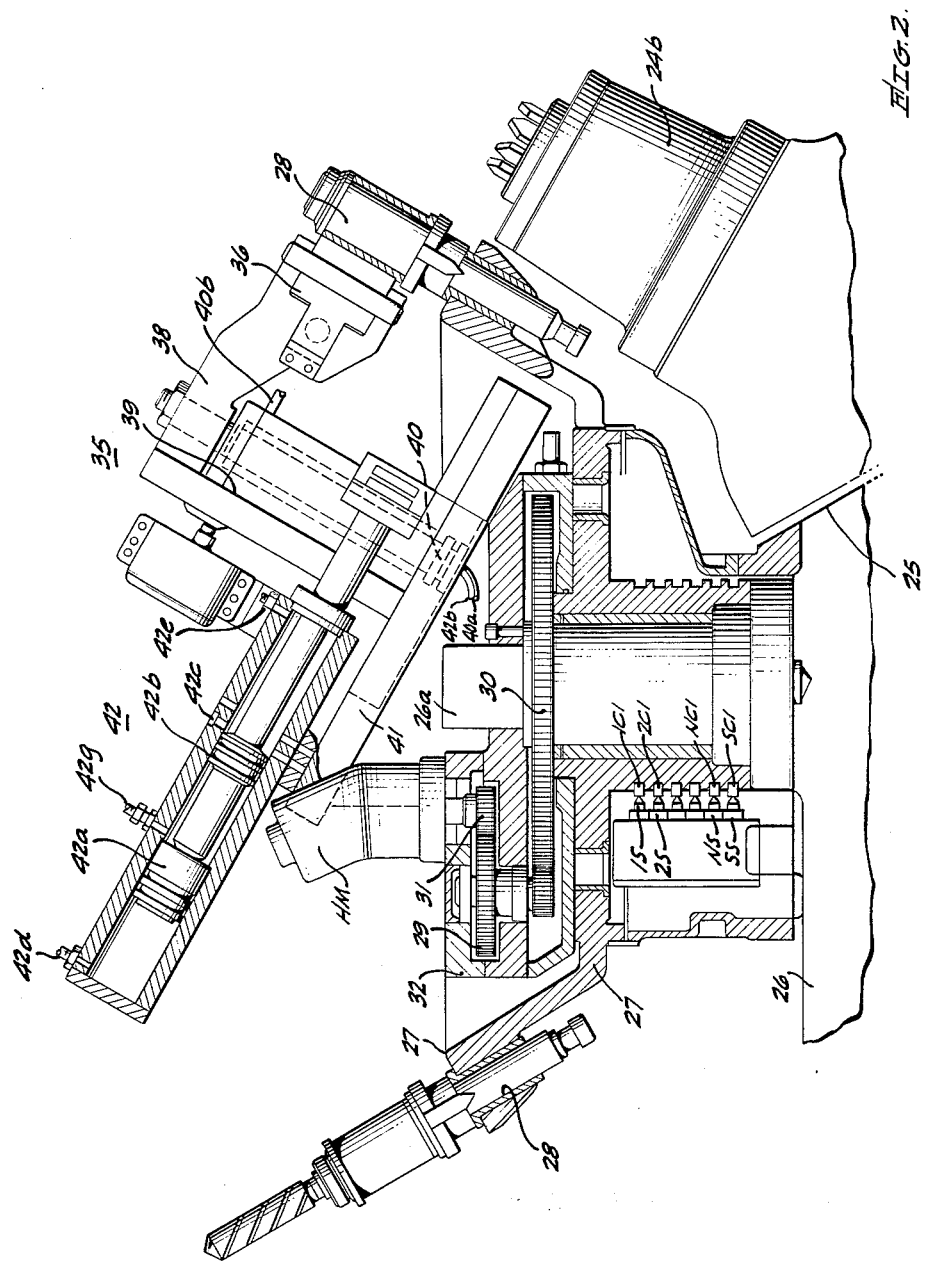

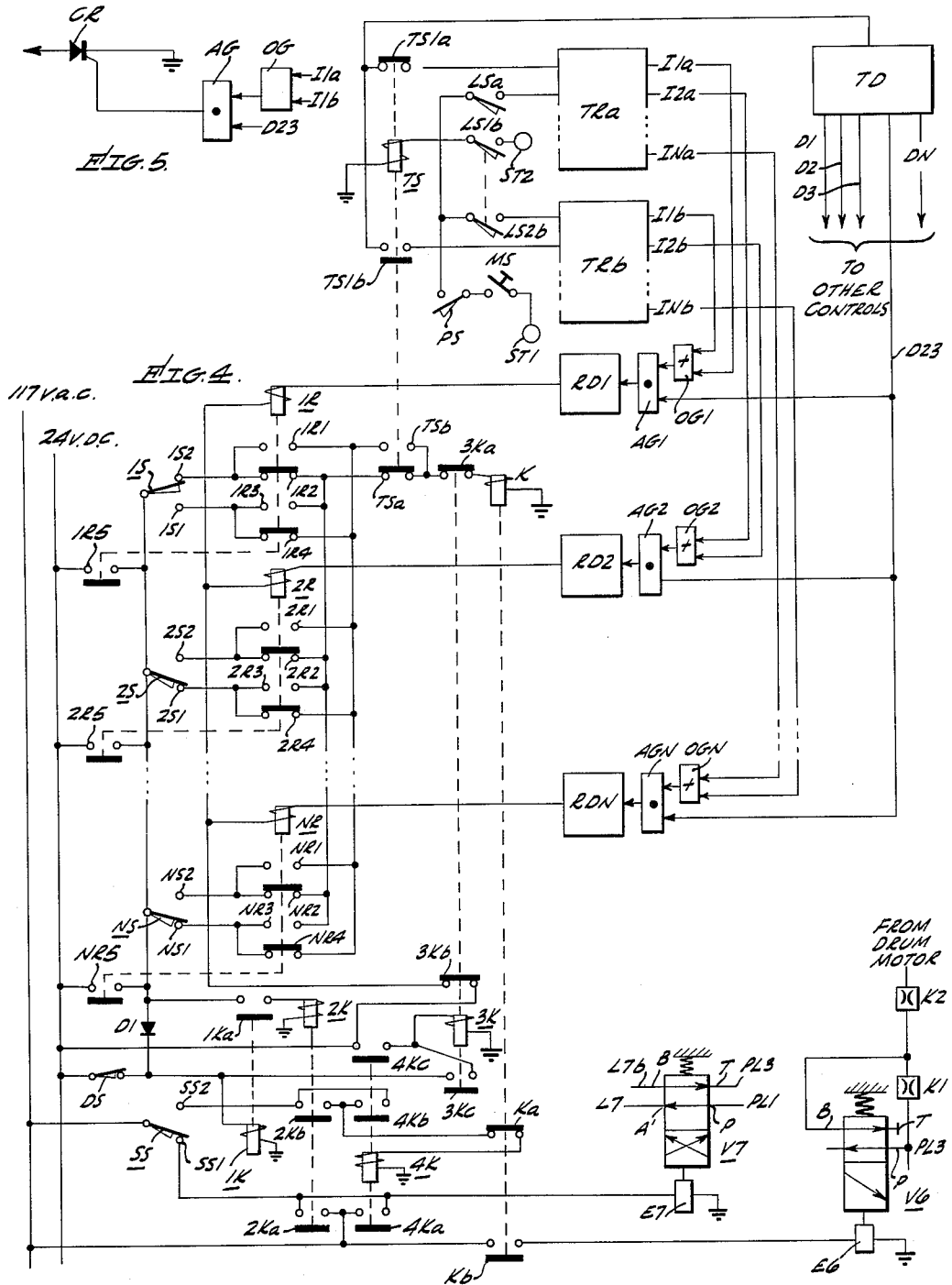

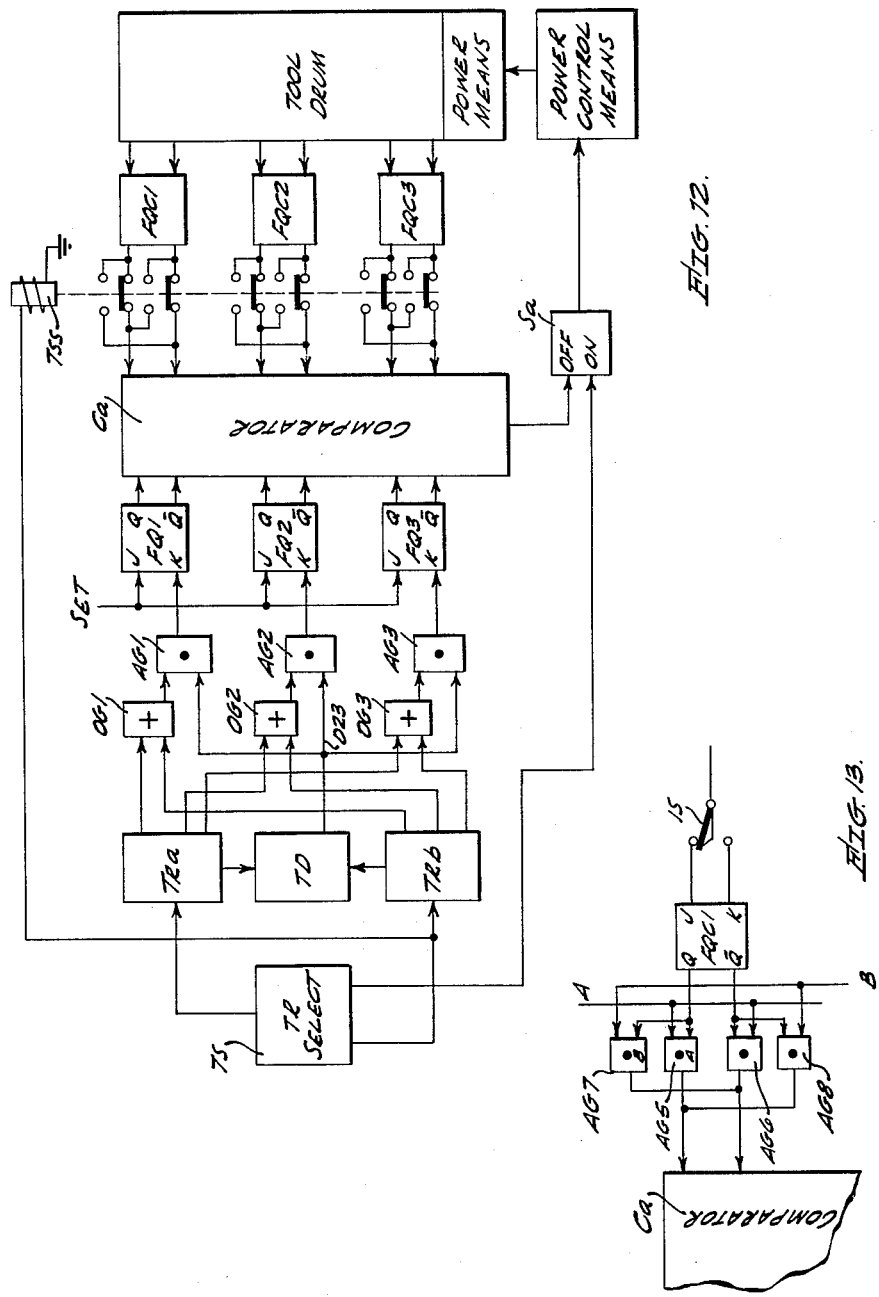

United States Patent Office 3,225,439
Patented Dec. 28, 1965

3,225,439
MACHINE TOOL CONTROL
Charles B. Perry, Palos Verdes Estates, and William F. Webb, Torrance, Calif., assignors to Hughes Aircraft Company, Culver City, Calif., a corporation of Delaware
Filed May 29, 1962, Ser. No. 198,681
15 Claims. (Cl. 29—568)

This invention relates generally to machine controls, and more particularly to an electrical control for a machine tool having an automatic tool changing facility.

Some modern machine tools are equipped with tool magazines or tool drums which are designed to carry a plurality of tools. Such drums are usually indexable from one position to another to present selected tools to a tool handling device which is used to automatically interchange tools between the tool drum and a tool chuck in a machine tool spindle. Frequently, such machine tools are controlled by a discrete signal type of program controller, usually a tape reader, which utilizes a system of tape marks based on a suitable numerical code, to indicate a tool to be selected from a tool drum, to indicate the desired position of a machine tool carriage in one or more directions, to indicate feed rates for machine tool cutting operations, to initiate coolant flows during cutting operations and miscellaneous other types of controls. The numerical programs vary with the particular application.

Tool identification in tool magazines or drums may be accomplished in one of two ways. One is to code the individual tools, that is, apply suitable code markers to each tool. When a particular tool is identified on the tape, the particular code configuration identifying this tool is searched for by means of a suitable sensor. The tool magazine moves the coded tools past the sensor and whenever the properly marked tool approaches or moves past the sensor the tool magazine is stopped and the tool selection is completed. The other way is to identify the tool storage slots in the tool drum. In this arrangement, the tool drum carries suitable groups of markers arranged in circumferentially spaced groups around the drum. These markers, which may be of the form of cams, are sensed by means of switches. This arrangement eliminates the need for coding individual tools and requires only that a particular tool be placed in a particularly identified slot so that when that tool is to be selected the programmer then indicates the desired slot. This latter expedient simplifies the tools in that the markers are transferred from the tool to the drum and thereby reduces costs insofar as the individual tools are concerned.

Ordinarily, a machine tool of this type is equipped with a single machine table which may be movable in orthogonally related degrees of freedom and may also be angularly indexable. With such an arrangement the machine is ordinarily adapted for handling one part at a time, that is, the tools for a particular part are loaded into the tool magazine and where more than a single part is to be machined the machine tool is repeatedly operated to machine all of the identical parts. However, when a run of different parts is involved this type of operation can be relatively inefficient requiring reloading of the tool drum to whatever extent is required as each new part is brought up for machining. Where just a few tools are involved in machining the parts there may be considerable tool drum storage capacity which is unused.

Where such machine tools are to be used to concurrently store tools for more than one production part or workpiece problems are created with respect to tool storage capacity and tool identification.

In the situation where tool coding is employed the tools must all be differently numbered. The programmer must know the highest number of the tools that will be required for machining one part before he can start programming the tools for the second part. In most instances the use of tool coding requires the programming of parts in preselected pairs to avoid tool number duplication. This, of course, then almost necessitates always running these parts together. In other words, any attempt to work another part other than the one paired off and programmed with a particular part in the first instance requires very careful attention to the tool problem, both from the viewpoint of the numbering of the tools, as well as from the viewpoint of the total capacity of the drum. In any case, this approach to the problem lacks the convenience of programming each part starting with tool No. 1 and thereafter selecting parts for machining in pairs solely on the basis that the total number of tools required for the parts to be machined in sequence does not exceed the total capacity of the tool magazine or tool drum.

If tool slots in the tool magazine or drum are to be numbered, then groups of slots may be assigned to the tools for each part. For example, if there are 30 tool slots in a particular drum, 15 tool slots may be arbitrarily assigned for each slot. Thus, any part requiring more than 15 tools in the absence of other specific considerations would almost necessarily be run independently of any other part. While this approach inheres the simple tool structure resulting from coding of the tool slots in the drum rather than the tool per se and also lessens the programming problems since the slot numbers are fixed, this approach limits the number of tool storage locations available for each part and thus may be wasteful of tool storage space.

One object of this invention is to provide an improved control for a machine tool having a tool storage magazine or drum which efficiently utilizes the tool storage space of the tool magazine in the concurrent storage of tools for machining two different parts.

With reference to the preceding object, it is a specific object of this invention to provide a machine tool system of the character referred to wherein dual identification of the tool storage slots in the tool magazine or drum is employed.

It is also an object of this invention to provide a machine tool control of the character aforesaid in which the problem of tool identification is minimized.

Yet another object of this invention is to provide a machine tool control system of the character referred to which permits the random assignment of tool identification numbers to the tools.

The aforesaid and other objects and advantages are accomplished in a machine tool system which includes a machine tool having a workpiece table conventionally movable in each of two horizontal degrees of freedom and indexable to permit the presentation of different faces of a workpiece mounted on the table to a cutting tool. Such a table may also include a vertical degree of freedom. Such a machine tool may further include a tool spindle assembly and drive therefor mounted upon a suitable carriage movable toward and away from the workpiece table for the purpose of engaging a cutting tool spindle system with a particular workpiece. A tool magazine or drum may be mounted upon this tool carriage to move therewith. Such a tool magazine or drum may include a plurality of tool storage slots and may be mounted to be angularly indexed to present any one of the tool storage slots to a particular position which may be identified as a tool exchanging position. A suitable tool exchanger mounted on the tool carriage interchanges tools in tool exchange position between the tool spindle and the tool magazine or drum.

Provision is made on the tool magazine to identify particular tool slots by means of suitable markers. These markers may be mounted in circumferential positions on the tool drum and may be of the form of respective groups of cams which are arranged in specific physical organizations in accordance with some numerical code, for instance, a conventional binary code, of as many bits as may be required to accommodate the total number of tool slots in the tool magazine or drum. A reading station including a plurality of cam operated switches arranged to be actuated by the cams as the cams sweep therepast during rotation of this drum indicates the numerical identification of each of the tool slots.

Suitable electronic controls under the control of a tape reader may be provided to store information in the form of a binary code identifying tool numbers, machine tool table positions, tool carriage movements, etc., for distribution to different power means controlling the several elements of the machine tool to effect operation in accordance with the program which is specified on the tape.

For enabling the concurrent storage of tools for two different parts so that machine down time may be minimized in going from one part to another the present invention provides an electrical system of control which permits the use of dual number identities for each of the tool slots in the tool drum. By this expedient, assuming a circular type of drum, the tool slots, assuming again a 30-tool slot drum, may be numbered 1 through 30 in a clockwise direction and 1 through 30 in a counter-clockwise direction. To visually distinguish between these different numbers the clockwise set of numbers may be on a red background and the counter-clockwise set of numbers may be on a green background, or the numbers may each have a suffix "a" in the clockwise direction and a suffix "b" in the counter-clockwise direction. Thus, a particular slot may be numbered 13a–18b. Any other suitable expedient for distinguishing between the dual number identities at each of the tool slots may be utilized.

The electrical system for an arrangement of this type normally includes a pair of tape readers. For the purposes of this discussion one may be referred to as the red or "a" tape reader and the other may be referred to as the green or "b" tape reader. The tape which is used in such a machine tool system may be conveniently coded using binary decimal codes to permit convenience in reading the code which has been punched. When writing the program for the two parts the tool numbers assigned to each of the parts may begin with "1" and be consecutively numbered. For instance, the tools for machining the part under the control of the program of the tape of tape reader "a" may be numbered "1" through "18" or "1" through "20," as the case may be, and the tools for part "b" may be similarly numbered beginning with "1" and proceeding consecutively. The only requirement for concurrent storage of the tools for the parts "a" and "b" is that the total tool requirement for machining the parts must not exceed the total tool storage capacity of the drum. Thus, the programmer need not be concerned at all with the tool numbering problem and merely needs to specify consecutive tool numbers beginning with number "1." Assuming that parts "a" and "b" selected at random have a total tool requirement less than the total tool storage capacity of the tool drum the tools for each of the parts are loaded in the correspondingly numbered slots, that is, all of the tools for the part "a" are loaded into corresponding "a" numbered slots in the tool storage drum and the tools for part "b" are loaded into the corresponding "b" numbered slots of the drum.

In operation, therefore, provision is made so that when the tape reader "a" is coupled into the system to control the machine tool the system selects only those tools which are identified with the numbers ending in "a" and when the tape reader "b" is used to control the machine tool system only those tools associated with the number "b" are selected.

According to a particular embodiment of this invention this is accomplished through a suitable control system in which individual binary relay contacts are set in correspondence with the tool number identities which are read from the tape. The control includes dual double pole relay contacts which are wired into a tape selector switch circuit in such a manner as to select a particular binary number or its complement, depending upon the setting of the tape selector switch. When tape reader "a" is being used the tape selector switch is in one of its two positions and when tape reader "b" is being used this tape selector switch is in the other of its two positions in which the complement of the binary number specifying the particular setting of the binary relay contacts is selected or vice versa. Thus, referring to the example hereinabove, for a 30-slot magazine, if tool "13" is specified by tape reader "a," the tape selector switch is deenergized and tool number "13a" is indicated by the number "13" at the binary relay contact. If tool "13" is specified by tape reader "b," the tape selector switch is energized and tool number "13b" is indicated by number "18" at the binary relay contacts. For the particular example involved, i.e., a tool magazine or drum having 30 tool slots, the number "18" is referred to as the complement of the number "13." This is merely exemplary of the situation. The specific number which is called for, that is, "1" through "30," will depend upon the particular setting of the binary relay contacts which in turn depend upon the numerical information which is on the tape.

The selection of either the red or "a" tape reader and the green or "b" tape reader may be manual, in which case, when the operator places either part "a" or "b" in the machine for operation he thereafter actuates a suitable electrical switching device to indicate which of the tape readers "a" or "b" is to be selected. Operations may be expedited, however, and improvements over this manual type of operation effected in the use of an arrangement involving a shuttle pallet system associated with the machine tool and involving two pallets which are mountable upon respective sets of pallet slides which are mechanically interconnected on a pallet carriage and respectively movable between positions indexed with the main table. By this expedient when pallet "a" is in indexed position for loading on the main table the pallet "b" is out of position and vice versa. Thus, suitable limit switches associated with the shuttle pallet carriage may be used to indicate which of the tape readers is to be selected. The operation then becomes automatic, being manual only in the sense that during a machine operation, say on part "a," the attendant may be mounting the other part, i.e., part "b," on the other shuttle pallet and readying it on the shuttle pallet carriage to be moved into position at the time the machining on the part "a" is completed.

The aforesaid and other objects and advantages will become apparent from a study of the following specification when considered in conjunction with the accompanying drawings in which:

FIG. 1 is a plan view of a machine tool system embodying the principles of this invention;

FIG. 2 is a fragmentary sectional view taken on the line 2—2 of FIG. 1 and showing enlarged details of certain features of the machine tool arrangement of FIG. 1;

FIG. 3 is a fragmentary detail of the tool drum of FIG. 1 drawn to the same scale and illustrating the tool drum detent mechanism;

Figure 8:
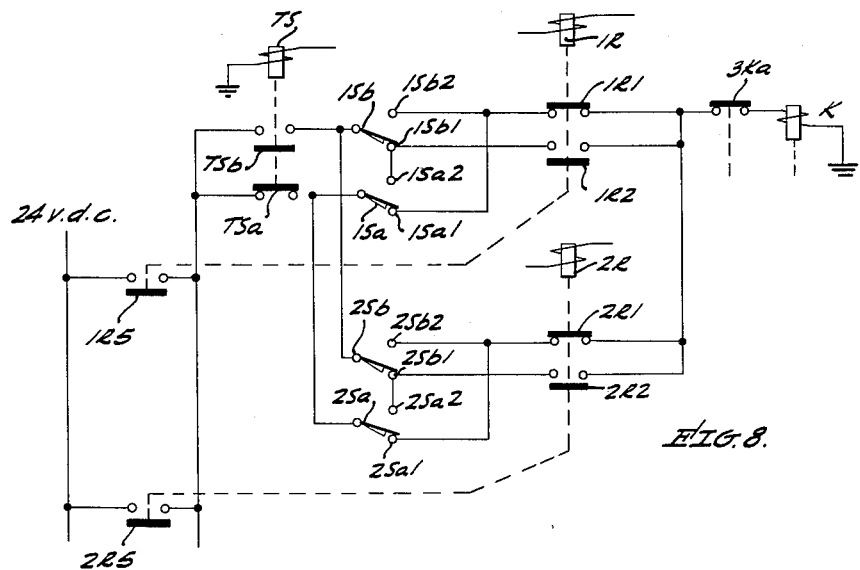
Figure 9:
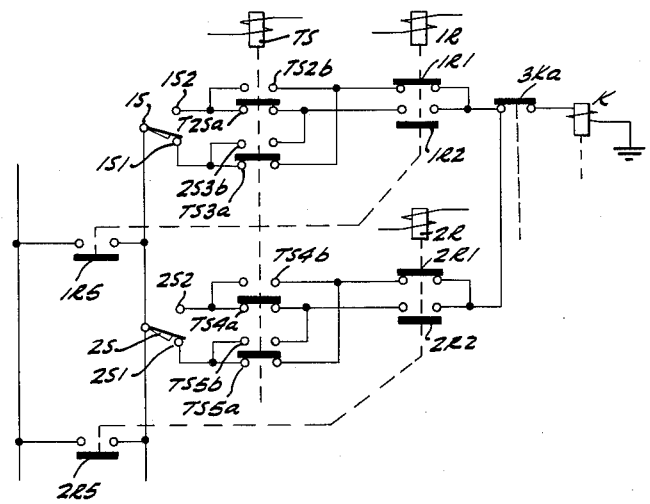

FIG. 4 diagrammatically illustrates an electrical system embodying the principles of this invention and applicable in the control of a machine tool arrangement of the character illustrated in FIGS. 1 through 3;

FIG. 5 is a circuit detail of a relay driver and associated circuits of the type embodied in block form in FIG. 4;

FIG. 6 is a relay timing diagram;

FIG. 7 is a developed view of a representative tool drum binary cam configuration arranged to correspond to FIG. 6;

FIGS. 8 and 9 illustrate modifications of the relay circuits of FIG. 4; and

FIGS. 10 through 13 show further modifications of the invention.

With reference to FIGS. 1 through 3, the machine tool system illustrated therein may be identified as a machine tool center involving a plurality of machine tools grouped around a common base. In this illustration the common base is generally designated "1" and mounts a suitable table "2" for movement through orthogonally related degrees of freedom, that is, two horizontally and one vertically, for example, and additionally mounted for angular indexing. The details of this arrangement are not illustrated inasmuch as they form no part of this invention. The machine tool table 2 is provided with suitable pallet slides 3 adapted to mount a pallet such as typically indicated at PA. Facilities are provided in the machine table for grasping and clamping the pallet PA once it has been indexed. Such facilities are not illustrated in detail but may include a rotatable coupling input member 4 provided with a key 4a adapted to mate with a slot 4b in a coupling member 5 powered by a power unit 6 carried by a shuttle pallet carriage 8.

Pallet slides 7 are secured to the pallet carriage 8 which rides on ways or guides 9. A second set of pallet slides 10 is mounted upon the pallet carriage 8 in positions axially spaced from the pallet slides 7. The shuttle pallet carriage is movable between the position indicated, in which the pallet slides 7 on the shuttle pallet carriage are aligned with the pallet slides 3 on the machine table, to a second position in which the pallet slides 10 on the shuttle pallet carriage are aligned with the pallet slides 3 on the machine table. Respective cams 12 and 13 are mounted adjacent opposite ends of the shuttle pallet carriage and move therewith between positions respectively actuating limit switches LS1b and LS2b when the pallet PB is in position and actuating a limit switch LSa when the pallet PA is in position for loading on the machine table. The limit switch assemblies LSa, LS1b and LS2b are respectively utilized in connection with the selection of respective tape readers, yet to be described, associated with the parts on the respective pallets. The movement of the shuttle pallet carriage between the two indexed positions mentioned may be accomplished manually or automatically, as desired. The details of such an arrangement are not illustrated herein in the interest of simplicity.

Provision is made for engaging and moving the shuttle pallets between positions on the shuttle pallet slides and the machine table slides. This is represented in an actuator, generally designated 15, which may be hydraulic in nature. This actuator is mounted on the pallet carriage and is provided with a pallet coupling member 16 having an eccentric dog 17 projecting therefrom. This actuating member may be rotated 180°, for example, between the position illustrated to a second position in which the dog projects from the left side of the actuator head 16 between projections 18 on the pallet PA. A similar set of projections 18 are illustrated on the pallet PB.

At the conclusion of a machine operation the machine table is normally moved to a position in which the machine table slides 3 abut the ends of the pallet slides 7, for example, in which position the coupling 4 is engaged. Rotation of the power device 6 now results in unclamping of the pallet PB. Actuator 15 is moved to a position in which the dog 17 is adjacent the projections 18 on the pallet PB and then rotated to engage the dog 17 between the projections 18. As the actuator is retracted the pallet PB is moved on to the pallet slides 7 on the shuttle pallet assembly. At this point the shuttle table may be moved to the right aligning the slides 10 supporting the pallet PA with the machine table slides 3. Rotation of actuator head 16 now engages the dog 17 between the projections 18 of shuttle pallet PA and when the actuator 15 is extended the pallet PA is moved into position on the machine table slides 3. Thereafter, the power device 6 may be operated to clamp the pallet PA in position on the machine table to complete the pallet exchange.

The machine tool center additionally includes a dual spindle machine tool, generally designated 20, a milling machine, generally designated 21, and a multiple spindle drill, generally designated 22. Each of these units is mounted upon bases, respectively designated 20a, 21a and 22a, having portions which are secured to the base of the machine table 1 to provide an integrated assembly. The number of such tools may be less than that indicated and, of course, the tools may be different than those indicated.

This invention is particularly concerned with the machine tool 20 and the following detailed description will be concerned primarily with this machine tool.

The machine tool 20 includes a dual spindle assembly, generally designated 24, which includes a spindle 24a and a spindle 24b. The spindles 24a and 24b are mounted at an angle to one another defining an angle therebetween of approximately 60°. In the position illustrated the spindle 24a extends parallel to the tool base and the spindle 24b projects upwardly therefrom approximately at an angle of 60°. As will be seen from reference to FIG. 2, this dual spindle assembly is mounted for rotation on a bearing surface 25, only fragmentarily shown, which occupies a position in a plane substantially normal to a line bisecting the axis of the spindles 24a and 24b, in which position the spindles may be selectively rotated between a tool exchanging position, as indicated for the spindle 24b in FIG. 22, and an operating position, as indicated for the spindle 24a in FIG. 1.

Although a dual spindle assembly is herein illustrated, it will be appreciated that other arrangements may be utilized which conventionally involve only a single spindle.

The spindle assembly 24 is mounted for rotation about an axis bisecting the angle between the spindles, as described, upon a suitable tool carriage 26 which is only fragmentarily shown in the enlarged detail in FIG. 2. The tool carriage 26 is conventionally mounted to ride on machine slides or ways on the tool base 20a for movement between retracted and working positions with respect to the machine table 2.

The tool carriage 26 is equipped with a vertical tool drum spindle 26a which is stationary and which rotatably mounts a tool drum or magazine, generally designated 27. The tool drum includes an outwardly sloping rim surface provided with tool slots, generally designated 28, each having an axis paralleling the axis of that tool spindle in tool loading or tool exchanging position whenever that tool slot is indexed in tool exchanging position with respect to that spindle. This is indicated by the tool 28 which is shown in tool exchanging position adjacent the tool spindle 24b. The tool drum is powered by means of a gear drive 29 which includes a large gear 30 which is secured to the tool drum 27. The drive 29 is powered by means of a hydraulic motor, generally designated HM, having an output pinion 31 mating with the input gear of the drive 29. The gear drive 29 and the hydraulic motor are mounted upon a suitable stationary support 32 which is mounted upon the upper end of the spindle 26a.

Tools are exchanged between the tool drum and that spindle which is in tool exchanging position by means of a tool handling mechanism, generally designated 35. Briefly, this assembly comprises a tool clamp which includes a pair of opposed spring loaded jaws 36 which are mounted on the end of an actuating arm 38. Actuating arm 38 is mounted upon a slide carriage 39 which is actuated by a piston 40. The axis of carriage 39 parallels the axis of the tool slot in tool exchanging position and the stroke of the piston 40 is sufficient to completely withdraw the tool shank from the slot in the tool drum periphery and to elevate the bottom end of the tool shank to a position clearing the upper end of the empty spindle. The carriage 39 is mounted on a slide carriage 41 at right angles thereto. The slide carriage 41 is powered by a piston assembly, generally designated 42, which includes a first piston 42a and a second piston 42b secured to an output shaft 42c which is coupled to the slide 39. When this tool handling assembly is retracted completely to the left, in which position the piston 42a is at the left end of the cylinder, application of hydraulic fluid to inlet ports 42d and 42e simultaneously results in stroking of the two parts of this piston assembly to the right to the position illustrated which engages the spring loaded jaws 36 with tool 28. This is effected by reason of the differential forces in favor of a piston 42a due to the differing diameters of the pistons 42a and 42b. At this point fluid pressure is applied to an inlet port 42f which elevates the tool handling mechanism withdrawing tool 28 from the slot in the tool drum. At this point the application of fluid under pressure to inlet port 42g of the power cylinder assembly 42 and the connection of fluid port 42e to drain results in stroking of the piston 42b completely to the right to position tool 28 over the spindle 24b. Connection of fluid pressure to fluid port 40b retracts the slide 39 and inserts the shank of the tool 28 into the spindle 24b. At this point the application of fluid under pressure to port 42e and the connection of ports 42d and 42g to drain results in stroking of the power piston assembly 42 completely to the left to completely retract the tool handling mechanism. Although the details of the controls which provide the operating sequence above are not believed essential to an understanding of this invention, reference may be made to application Serial No. 135,936, filed September 5, 1961, entitled Machine Tool, and assigned to the assignee of this invention.

The tool drum 27 may include any number of tool slots which its size permits. In one practical embodiment of this invention such a tool drum was provided with 30 slots and as such the requirement was that the tool drum be indexed in positions presenting any one of the tool slots in tool exchanging position. This is accomplished by means of a fixed switch station including a plurality of cam operated switches. A total of 5 such switches have been illustrated, 1S through NS, which are equipped with displaceable mechanical actuators which are selectively actuated by binary cams, generally represented 1C1 through NC1. The switch station additionally includes a stop switch, generally designated SS, actuated by a stop cam SC1. The stop cams, of which cam SC1 is representative, are positioned in a position appropriately aligned with each tool slot. Thus, there will be 30 such cams distributed circumferentially of the tool magazine. However, the binary cams which actuate the binary switches 1S through NS are arranged to define a particular decimal number in terms of a suitable binary code, such as a conventional binary code, and as such the presence or absence of a binary cam at a particular angular position on the tool magazine depends upon the cam configuration required to provide the switch positions of the binary switches 1S through NS to identify that particular angular position or tool slot. Thus, the binary cams indicated in FIG. 2 are merely illustrative and may represent a tool drum position slightly ahead of binary cam position 1 of the drum in the direction of rotation, as will be described at a later point.

The tool drum is pinned by means of a piston powered detent, generally designated 45 in FIG. 3. At such time as the tool magazine is to be moved the piston powered detent is retracted to disengage the tool drum so that it may be rotated and at such time as indexing has taken place under the control afforded by the binary cam switches 1S through NS the piston powered detent is operated to again engage and pin the tool drum in indexed position. While not so illustrated, the detent 45 may be provided with a tapered end adapted to engage suitably tapered cavities in the bottom side of the tool drum whence final precise indexing may take place, if needed, at such time as the detent is rammed home under hydraulic pressure.

The piston powered detent 45 strokes in a suitable cylinder which is provided with an inlet port at the bottom side communicating with a fluid pressure line, generally designated L7 and a fluid port at its top side communicating with a fluid line L7b. Interlocking between the piston powered detent and the hydraulic motor HM is provided by means of a line L7c communicating with a port displaced below the upper end of the cylinder in which the piston powered detent operates a sufficient distance that when the detent is retracted hydraulic fluid applied through the line L7b communicates with the line L7c to operate the hydraulic motor HM. Thus, to retract the detent and operate the tool drum fluid under pressure is applied to the line L7b which moves the detent downwardly as viewed disengaging the drum. With downward movement of the detent 45 line L7c communicates with fluid pressure line L7b and the hydraulic motor HM operates. When indexing is completed and the drum has stopped, fluid pressure is switched to the line L7 which now powers the detent upwardly engaging the detent with the drum, completing the indexing and pinning operation. The operation of this assembly will be described in further detail in connection with the electrical controls illustrated in FIG. 4.

A tool arrangement of the type illustrated in FIGS. 1 through 3 may be controlled by a suitable discrete signal program device, such as a tape reader. Such a tape reader may be of any suitable type and, in the interest of convenience, will be described as utilizing a tape in which the information on the tape is provided in a conventional binary code, such as a binary decimal code. The information on such a tape will vary with the particular application but may be comprised of suitable marks on the tape arranged as a series of parallel information groups or rows covering such items as special commands, position information and auxiliary commands in the sequence named.

Since the information groups or rows are serially presented, some suitable means is usually provided to distribute the serially presented information to different points in the system as the tape reader steps or moves from one information row to the next. Such a distributor may be identified as a tape distributor and may be an ordinary stepping switch synchronized with tape reader movement and comprising several banks of switches corresponding in number to the number of information bits in each particular row and each having as many switch positions as there are rows of information to be read. Such details, being conventional, are not illustrated in the interest of simplicity since, per se, they form no part of this invention. Such a control may specify a particular tool under special commands by a specific tool number or may specify a particular tool under auxiliary controls. Thus, prior to the time a machine operation is started, and assuming an empty tool spindle in tool exchanging position, the tool drum 27 will be indexed to present a selected tool, as specified on the tape, to tool exchange position and thereafter to initiate the operation of the tool handling mechanism to effect an interchange of the selected tool between the tool drum 27 and that spindle which is in tool exchanging position. Thereafter the loaded spindle is rotated from tool exchanging position to tool operating position by rotation of the dual spindle assembly. At that point, assuming that positioning of the machine table 2, with respect to the tool spindle, has taken place, the tool carriage may be moved and the loaded tool spindle rotated to perform the machine operation which is indicated on the tape.

In the arrangement illustrated herein the identification of a tool is accomplished by identifying a particular tool slot. The attendant operating the machine therefore loads selected tools into the respective tool slots so that upon selection of a tool slot by the identification of a suitable binary code the proper tool will be presented to the workpiece for the indicated operation. The arrangement thus far described permits the operation of this machine tool system using tools in the tool drum for a single part only. To permit concurrent storage of tools in the tool drum for two parts this invention provides a control permitting dual identification of each of the tool slots which are provided in the tool drum. In this connection reference may be made to FIG. 1 wherein the tool slots are fragmentarily indicated in the tool drum and each slot bears a dual identification. For instance, one slot may bear the identification 6a and 25b; another slot may bear the identification 20a and 11b; another slot may bear the identification 25a and 6b.

A control system which implements this character of operation is diagrammatically illustrated in FIG. 4 and includes a pair of tape readers, generally designated TRa and TRb, one tape reader for each of the two parts which are to be machined. These tape readers are each equipped with a plurality of output circuits corresponding in number to the number of the bits of information which are in each row of the tape. These are represented for tape reader TRa I1a through INa and for tape reader TRb I1b to INb. Any suitable number of bits of information may be provided. Each time a row of information on the tape is moved into reading position, the output circuits of the tape reader are enabled and provide an indication of the presence or the absence of a hole in the tape. The row-by-row distribution of this tape reader information to different points in the system is effected by means of a tape distributor, generally designated TD, which as indicated herein is under the control of the selected tape reader. The respective output circuits of the tape readers which provide this control of the tape distributor are coupled thereto through the respective contacts TS1a and TS1b of a tape selector relay, generally designated TS. If the tape reader TRa has been selected the relay TS is deenergized and contacts TS1 are closed. Therefore, the tape distributor, whether it be of the switch type referred to hereinabove or some electronic type such as a counting circuit, is stepped synchronously with the operation of tape reader TRa. Similarly, if tape reader TRb is connected into the system the relay TS is energized and contacts TS1b are closed so that the tape distributor TD is synchronously stepped with the operation of the tape reader TRb.

The tape distributor has a plurality of outputs. These are generally represented D1 through DN. The output D23, as a typical example, which corresponds to the switch position or count of the tape distributor 23, is shown here as being that output circuit which enables coupling of the tape reader information into a group of binary relays, generally designated 1R through NR. This indicates that tape row 23 of a particular block of information on the tape being read contains the information identifying a particular tool. The corresponding outputs of the respective tape readers are connected together in "or" gates, respectively designated OG1 through OGN. The details of these "or" gates are not illustrated but the gates may be any conventional type of gate circuit, such as the well known diode gating circuits (see Patent No.2,803,401). The output of the respective "or" gates are applied to one input circuit of respective "and" gates AG1 through AGN, the other input of each of which is commonly coupled to the output circuit D23 of the tape distributor. Depending upon which of the tape readers TRa or TRb have been selected, the electrical output of the selected tape reader is applied to the input to the "or" gate. The other tape reader under this condition is deenergized; hence, only the signals from the selected tape reader appear upon the inputs to the respective "or" gates.

At such time as the signal provided by circuit D23 is applied to the "and" gates the information appearing on the output circuits of the selected tape reader are gated to the input circuits of respective relay drivers RD1 through RDN. These relay drivers respectively control the binary relays 1R through NR to set these relays in correspondence with the hole configuration existing in row 23 of the tape which is being read. The convention which may be adopted here is that the presence of a hole in the tape represents a binary 1 and will be utilized to produce an output signal at a relay driver to energize the associated relay. Thus, further, if the convention is adopted that the respective holes on the tape are weighted 1, 2, 4, 8, etc., then the relay drivers may be correspondingly weighted so that relay driver RD1 is weighted 1, relay driver RD2 is weighted 2, etc. Hence, if relay driver RD1 produces an electrical output and the remaining relay drivers are not actuated, indicating a hole, position 1 of row 23 of the tape, the relay 1R is energized and the relays 2R through NR are deenergized. The decimal number 1 is represented by this particular configuration.

The binary relays 1R through NR form part of a circuit which is utilized to control the operation of the drum and to this end the setting of the contacts of these respective relays is compared with the setting of the cam operated binary switches 1S to NS, at the switch station on the tool drum, to initiate rotation of the tool drum at such time as there is disagreement between the binary numbers represented by the setting of the binary relays and the binary switches, and to stop the tool drum when the binary switch positions correspond to the contact positions of the binary relays.

This character of control is accomplished by connecting selected contacts of the binary relays and the binary cam operated switches in series circuit relation with suitable switching means which forms part of a control arrangement for controlling a drum speed control valve V6 and a detent and drum operating control valve V7. The arrangement is such that the said switching means is operated at any time that the binary relays are set in accordance with tape commands and there is disagreement between the setting of the contacts, these relays and the cam operated binary switches, and the said switching means is rendered inoperative at such time as correspondence between the cam operated binary switch settings and the binary relay contact settings is achieved. These circuits also include provisions for effecting this control of the switching means regardless of which of the tape readers has been selected.

To this end the binary relays are provided with groups of contacts which when the relays are deenergized are in contact positions representing zero, say, for tape reader TRa and representing 1 for tape reader TRb and vice versa. Thus, for the convention adopted the individual binary relays always select the binary complement of the number specified on the tape when tape reader TRb is in use. Each relay is provided with five sets of contacts. Relay 1R is typical of these assemblies. The contacts on relay 1R are identified 1R1 through 1R5. The contacts on the other relays are correspondingly numbered. The contacts 1R1 and 1R4 have a common output terminal connected to the normally open contacts TSb of the tape selector relay TS. This contact of the tape selector relay is closed when tape reader TRb is selected. Contacts 1R2 and 1R3 have a common terminal connected to the normally closed contacts TSa of the tape selector relay TS. These contacts are closed when the tape reader TRa is selected. Contacts 1R1 and 1R2 have a common terminal connected to the terminal 1S2 of the binary switch 1S and contacts 1R3 and 1R4 have a common terminal connected to a terminal 1S1 of a binary switch 1S. The respective binary switches are each provided with two contacts. When the switch is closed on the lower of the two indicated contacts it will be assumed that the switch is in "off cam" position. When the switch is closed on the uppermost of the two indicated terminals it will be assumed that the switch is in "on cam" position. The convention will be adopted here that when the switch is in "off cam" position a binary 0 is represented and when in "on cam" position a binary 1 is represented.

The control relays which are controlled by the binary relays, the binary switches, a cam operated stop switch SS and a detent switch DS operated by the power detent 45, include the relays K through 4K. The coil of relay K is connected in series with a contact 3Ka of a relay 3K which contacts are in turn connected in series in the binary relay and binary switch circuit including selectively the contacts TSa or TSb, whichever are closed. Hence, at any time the binary relays are energized and the drum is not in the position indicated by the contact configurations of the binary relays a circuit will be completed through the coil of the relay K through one or more of the contacts of the respective binary relays and series connected contacts of the binary cam switches. Thus, at any time a tool selection is made and the drum is out of selected position, the relay K will be energized through these circuits.

The contacts 1R5 through NR5 of the binary relays establish a second circuit from the 24 volt direct current supply circuit to ground through a polarizing diode D1 to the coil of a relay 1K to energize this relay when any one of the contacts 1R5 through NR5 closes. A parallel circuit for the coil of relay 1K from the 24 volt supply conductor extends through the detent switch DS. This detent switch is open whenever the drum is pinned and closed whenever the detent is retracted and the drum released so that it may be rotated. This switch being controlled by the power operated detent 45 is effectively controlled by the valve V7 which controls the fluid pressure connections to the respective fluid conductors L7 and L7b, illustrated in FIG. 3, and communicating with the bottom and top of the detent piston 45 as illustrated.

At such time as the relay K is energized the contacts Ka of this relay are opened disabling a stop circuit, yet to be described, and the contacts Kb are closed. The contacts Kb connect a coil E6 of the valve V6 to a suitable supply of alternating current to energize this valve.

The relay 1K is provided with a single normally opened contact 1Ka. When relay 1K is energized and the contacts 1Ka are closed, an energizing circuit is completed for the coil of a relay 2K. This energizing circuit extends from the 24 volt direct current supply conductor indicated through any one of the binary contacts 1R5 through NR5 which is closed through the now closed contacts 1Ka and the coil of relay 2K to ground.

When relay 2K is energized its contacts 2Ka and 2Kb close. The contacts 2Ka form part of a control circuit for energizing a solenoid E7 of the valve V7 and are capable independently of the other elements in this control circuit at the time they close to connect the coil E7 across the 117 volt alternating current supply indicated. This control circuit additionally includes the normally opened contacts 4Ka of a stop relay 4K. Contacts 4Ka parallel the contacts 2Ka in the supply circuit for the solenoid E7. The control circuit additionally includes the contacts SS1 of the stop switch SS which is controlled by the stop cams on the tool drum as described in connection with FIG. 2. Contacts SS1 are closed when the stop switch is "off cam." The stop switch contacts SS1 parallel both contacts 2Ka and 4Ka.

The coil of relay 4K is connected across the 117 volt supply circuit indicated in a series circuit including the contacts SS2 of the stop switch SS, which are closed when the stop switch is "on cam," parallel connected contacts 2Kb and 4Kb of the relays 2K and 4K, the normally closed contacts Ka of relay K and the coil of relay 4K. Thus, at any time the relay K is deenergized the relay 2K is energized and the stop switch is "on cam" closing contacts SS2, a circuit is completed across the 117 volt supply energizing the coil of relay 4K.

The relay 4K additionally includes a normally open set of contacts 4Kc which are connected in series with the coil of a relay 3K across the 24 volt direct current supply circuit. After the relay 4K is energized relay 3K is energized. Whenever the relay 3K is energized the contacts 3Ka are opened which opens the energizing circuit for the relay K. As will be described at a later point the relay K is normally deenergized at the time this operation takes place and these contacts are therefore provided to prevent inadvertent reenergization of the relay K once a certain sequence in the operating cycle is completed. The contacts 3Kb disconnect all of the coils of the binary relays 1R to NR from the 24 volt supply circuit. The contacts 3Kc when closed complete a holding circuit for the coil of the relay 3K through the detent switch DS which is closed as long as the tool drum is out of detent.

The valves V6 and V7 are represented schematically. Referring, for example, to the valve V6 which is typical of both of the valves, it will be seen that the valve has a fluid porting section having two oppositely directed arrows transversely thereof and that the other section of the valve has two arrows in crossed relationship with the heads of these arrows pointed in the direction of the fluid porting section. This depicts the deenergized condition of the valve and indicates that the flow pattern through the valve is in the direction depicted by the horizontally disposed arrows. The crossed arrows indicate that upon energization of the valve the ports associated with the horizontally disposed arrows are reversed or interchanged and consequently the fluid flow at the output of the valve is reversed. The output ports of the valve are designated A and B, respectively, and the inlet ports of the valve are designated P and T, respectively, for "pressure" and "tank." Thus, the line PL1 represents a hydraulic pressure line from some suitable pressure supply source and the line PL3 represents a drain line communicating with some suitable sump or tank.

When the valve V7 is deenergized fluid pressure is applied to outlet port A and line L7. With reference to FIG. 3 this elevates the piston powered detent 45. When the solenoid E7 is energized the fluid pressure inlet port P connects with outlet port B applying fluid under pressure into line L7b which applies fluid pressure to the top side of the piston powered detent to retract the detent. Outlet port A and drain port T of valve V6 are plugged.

As indicated hereinabove, the tape distributor TD may be a conventional type of tape distributor switch synchronized with tape operation and disturbing information to various points in the system, particularly the binary relays as herein described. The details of this switch are not shown since such arrangements are conventional and such switches are commercially available. Similarly, the details of the tape reader have not been indicated in the interest of simplicity. The parallel readouts of the rows of information as they are presented to the reading station of such tape readers is in keeping with conventional practice and will be understood by reference to any commercial tape reader having successive rows of information bits on the tape. Also, the relay drivers may be of any particular conventional type.

However, one type of relay driver which has been found satisfactory for controlling the relays is represented in FIG. 5. This circuit involves a controlled rectifier, designated CR. The anode of the controlled rectifier CR represents the output circuit which may be coupled directly to the coil of any one of the binary relays 1R through NR. The cathode of the controlled rectifier is directly grounded. With the occurrence of an output from the "and" gate as the result of coincidence between the signal of circuit D23 and the output of "or" gate OG, the controlled rectifier is triggered and becomes and remains conducting. This completes an energizing circuit for the coil of a selected one of the binary relays through contact 3Kb of the relay 3K across the 24 volt supply circuit. The controlled rectifier remains conducting until the energizing potential across the anode cathode circuit is removed. Inasmuch as the relay drivers RD1 through RDN are similar, only one of these circuits has been illustrated as typically representing all such circuits herein.

The system will be better understood from an explanation of its operation. While an explanation of the operation of the system will be undertaken with respect to all of the drawings, particular reference will be made to FIGS. 4, 6 and 7. In this connection FIG. 6 is a timing diagram covering essential relays, solenoids and switches forming part of the system. FIG. 7 is a development of a representative cam arrangement for a tool drum. In the interest of simplicity, the illustration of FIG. 7 covers a drum having only six positions and to this end represents a simplification of the arrangement shown in FIG. 1. As a result of this reduction in the number of angular positions which must be identified by a particular cam and/or switch configuration, fewer binary cam operated switches are required than are illustrated, for instance, in FIG. 2 of the drawings. In FIG. 7 the respective switches are illustrated in block form on the extreme left and are designated 1S, 2S and NS for the required group of cam operated switches for indicating the six positions of the representative drum. Switch SS, also represented as a block, is the stop switch referred to in FIG. 4 and bearing the same identification and is actuated by the stop cams. Further, with reference to FIG. 7, the cam developments shown therein include in the least significant bit position the cams 1C1, 1C2 and 1C3. Cam 1C1 extends through binary cam position BP1 to a position adjacent binary cam position BP2. Cam 1C2 extends from a position through binary cam position BP3 to a position adjacent binary cam position BP4. Cam 1C3 extends through binary cam position BP5 and terminates adjacent binary cam position BP6. Thus, the switch 1S is switched to its "1" representing electrical state in position BP1 and maintains this electrical state until position BP2, at which time it switches to its "0" representing electrical state as it passes off the cam 1C1 to "off cam" position. This mode of operation continues through the binary positions BP3 through BP6 and then repeats. The cam operated switch 2S is controlled by cams 2C1 and 2C2. Binary switch 2S is the 2 weighted binary switch and having this significance is controlled by the cams so that it maintains its "1" representing electrical state through two adjacent binary cam positions and then maintains a "0" representing electrical state through the next two adjacent binary cam positions of the drum. Note may be made of the fact that the cam 2C2 is only half the length of the cam 2C1 since the number of angular increments do not permit a longer cam at this point. Switch NS, which in this instance may be the 4 weighted binary cam operated switch, is controlled by a single cam 4C1 which extends through three binary cam positions. The cams are all arranged to provide switch configurations in each of the positions corresponding to conventional binary codes whence, in passing from one binary position to the next as the drum is rotated, more than one of the switches change electrical configurations as distinguished from some other codes, such as the Gray code in which only one bit changes in sequence. The stop switch SS is controlled by cams SC1 through SC6, straddling the binary cam positions BP1 through BP6, respectively. For the arrangement illustrated, when the switches are in binary cam position BP1 of the drum it will be appreciated that the switch 1S is "on cam" and switches 2S and NS are "off cam." Thus, the binary configurations for the switches 1S through NS is 100, which for the weighting indicated (the least significant bit being on the left) designates binary cam position 1. In binary cam position 6 switch 1S is open, that is, "off cam" and switches 2S and NS are actuated by cams 2C2 and 4C1, respectively. Since the 2 weighted (2S) and 4 weighted (NS) switches are operated the decimal number 6 is represented by this switch configuration. Throughout the sweep of the cams past the cam operated switches the stop switch SS is operated in each of the binary positions by the respective stop cams as described.

FIG. 7 is scaled to correspond to the timing diagram of FIG. 6 so that the binary cam positions may be approximately correlated to relay operations. It will be noted that the drum positions DP1 through DP6 shown in FIG. 6 are displaced one position to the right from the correspondingly numbered binary cam positions on the drum. This identification of a drum position lagging a correspondingly numbered cam position by one angular increment is required by the controls herein. The controls provide for stopping of the tool drum on the next occurrence of a stop switch operation after coincidence between the binary cam operated switch positions and the binary relay contact positions takes place, as will be apparent hereinafter.

The operation of the system will be described primarily in connection with the operation which takes place in the selection of a particular tool in the tool drum and will not be concerned with all of those control complexes involved in the operation of the shuttle pallet, the machine table, the selection of tool spindles or the operation of the tool handling mechanism. It will be understood of course that controls for these various elements of the machine tool system are conventionally interlocked with controls of the type described herein to provide desired sequences of operation.

For the purpose of this description it will be assumed that the pallet PA has been loaded with a workpiece and has been moved into position on the work table, in which circumstance the pallet assembly will have been moved to the right, as viewed in FIG. 1, from the position illustrated in which the cam or projection 13 on the pallet assembly carriage engages and closes limit switch LSa. Additionally, a pallet switch, generally designated PS and indicated in dotted outline, may be provided on the machine table 2 to be closed at such time as a pallet is moved into position and clamped onto the table 2. Such a switch PS, as indicated in FIG. 4, may be connected in series with limit switches such as LSa and LS2b which latter are respectively in the energizing circuits for the tape readers TRa and TRb. A further control of this starting circuit for a particularly selected tape reader may be in the form of a manually operated switch, generally designated MS in FIG. 4, which is connected in series in the supply circuit from terminal ST1 with the pallet switch PS. Once the pallet is in position and clamped on the machine table the operator may then press the switch MS. If the operation is to be automatic the switch may be eliminated or may remain and be left closed so that repeated sequences of operation will be under the control of the pallet switch. These and other expedients will be obvious to those skilled in the art depending upon the specific requirement of a particular machine system.

Since the pallet PA has been selected and the limit switch LSa operated, the tape reader TRa has been selected. Upon closure of the switch MS energy is applied to the tape reader TRa and tape reading operation commences. This results in the production of electrical outputs on the respective output circuits I1a through INa of the tape reader TRa. Tape reader TRa having been selected the limit switches LS1b and LS2b are open. Limit switch LS1b in series in the coil circuit of the tape selector relay TS maintains this relay deenergized, while limit switch LS2b maintains the tape reader TRb deenergized. In this circumstance contacts TSa in series in the circuit for energizing the relay K are closed indicating that tape reader TRa has been selected. Contacts TS1a, which are normally closed when the relay TS is deenergized complete the circuit for controlling the tape distributor TD whence the tape distributor TD is stepped in synchronism with the presentation of the rows of information on the tape to the tape reading station. For the condition indicated in FIG. 4, as the tape distributor TD steps through position 23, a gate enabling electrical output signal appears on the circuit D23 which enables all of the "and" gates AG1 through AGN. In this interval the signals appearing on the electrical output circuits I1a through 1Na of the tape reader are applied as inputs to the respective "or" gates OG1 through OGN. The electrical outputs of these "or" gates applied as inputs to the remaining terminal of each of the "and" gates AG1 through AGN results in "and" gate outputs, for the convention adopted herein, each time a "1" representing electrical output appears at the input to one of the indicated "or" gates. In the interest of simplicity it will be assumed that only that electrical output designated INa of the tape reader TRa will be a "1" representing electrical output and the others will be "0" representing electrical outputs. This represents the decimal number "4" and identifies tool slot "4a."

For this assumed condition relay driver RDN produces an electrical output as described in connection with FIG. 5 hereinabove energizing the relay NR. When relay NR is energized the contacts NR1 and NR3 are closed and the contacts NR2 and NR4 are open. As indicated, the tool drum is in binary cam position 1 (it being assumed here that switch NS, in keeping with the discussion of FIG. 7, is a 4 weighted switch on the binary scale selected) and switches 2S and NS are in their "off cam" positions. When contacts NR5 of relay NR close, an energizing circuit between the 24 volt supply line and ground through the coil of relay 1K is completed. When relay 1K picks up contacts 1Ka close completing a second energizing circuit through the contact NR5 through the coil of relay 2K to ground which energizes relay 2K. At the time binary relay NR is energized with switch 1S "on cam" and switches 2S and NS "off cam" an energizing circuit is completed for the coil of relay K. This circuit extends through contacts NR5 now closed through contacts NS1 and NR3, through the closed contacts 3Ka of the relay 3K and the coil of relay K to ground, energizing the relay K.

The sequence of energization of the control relays is depicted in FIG. 6 wherein the energization of relay K and relay 1K, each of which depends upon the energization of one or more of the binary relays in a situation in which the drum is not in the position selected by the binary relays. Thus, the relays K and 1K pick up substantially simultaneously. Relay 2K which depends for its energization upon closing of the contacts 1Ka of relay 1K picks up one relay time later, that is, after relay 1K has closed. Whenever the relay K is energized the contacts Ka open and Kb close. The contacts Kb of relay K complete an energizing circuit for the coil of solenoid E6 of valve V6 between a 117 volt and ground, as indicated, which energizes the valve V6. As illustrated, the ports T and A of the valve V6 are plugged. When valve V6 is energized the port B communicates with the port P. Port B is connected on the upper side of a creep orifice K1 and the port P is connected to the drain line PL3 on the lower side of the creep orifice K1. Thus, the valve V6 operates when energized to shunt the creep orifice K1 leaving only the rapid traverse orifice K2 in series in the hydraulic circuit for the drum motor HM illustrated in FIG. 3. Thus, the drum motor operates at rapid traverse speed when the system is started.

At such time as the tool drum 27 is indexed, the stop switch SS is in a position closing contacts SS2. This is the "on cam" position of the stop switch and is the position the stop switch will occupy in position 4 (DP4) of the drum.

At the time the relay 2K is energized contacts 2Ka and 2Kb thereof close. Contacts 2Ka are connected in series with the solenoid E7 of the valve V7 between 117 volts and ground. Thus, when relay 2K picks up the solenoid E7 is energized operating the valve V7. This connects the fluid pressure line PL1 coupled to port P of valve V7 to the outlet port B and the fluid line L7b of this valve. As will be seen by reference to FIG. 3, fluid pressure is now communicated to the top of the detent piston 45 moving the detent piston to a position releasing the tool drum 27. When the detent is fully retracted the detent switch DS is closed. Closure of the detent switch DS establishes a second energizing circuit for the coil of relay 1K paralleling that circuit established through contact NR5 of the binary relay NR. The tool drum 27 now rotates, controlled in speed by the restriction to the flow of hydraulic fluid afforded by the rapid traverse orifice K2 in the hydraulic circuit for the drum motor HM. The initiation of operation of the drum motor HM is illustrated in FIG. 7 between "off" and "on" positions. The operation of the stop switch SS between "on cam" and "off cam" positions is also depicted in FIG. 6. All of the curves illustrated in FIG. 6 are ideally depicted as rectangular types of waveforms.

As the tool drum 27 moves from binary cam position BP1 through BP2 and BP3 the binary cam switch NS remains in "off cam" position with the contacts NS1 closed, maintaining the holding circuit for the coil of relay K. In binary cam position BP4 (drum position DP3) binary cam switch NS moves to "on cam" position being engaged by the cam 4C1. Both of the binary cam switches 1S and 2S move to "off cam" positions in which the contacts LS1 and 2S1 are closed. Recalling that the binary relay NR is energized and that the binary relays 1R and 2R are deenergized it will be observed that these positions of the binary cam switches result in interruption of all energizing circuits for the coil of the relay K and as indicated in FIG. 6 just ahead of drum position DP3, the relay K drops out.

When relay K is deenergized the contacts Ka are closed and the contacts Kb are opened. When the valve V6 is deenergized the shunt passage around the creep orifice is closed and the hydraulic motor is therefore switched to creep speed. When contacts Ka close with the drum in and about binary cam position BP4 with the stop cam switch SS in "on cam" position, a circuit for energizing the coil of stop relay 4K is completed. This circuit extends from the 117 volt supply circuit through the stop switch contacts SS2, through the now closed contacts 2Kb of the relay K, through the contacts Ka which are now closed and the coil of relay 4K to ground. When the relay 4K picks up the contacts 4Kc close completing an energizing circuit for the coil of relay 3K. When the relay 3K picks up it completes a holding circuit for itself through its contacts 3Kc extending from the 24 volt supply conductor through the now closed detent switch DS, the contacts 3Kc and the coil of relay 3K to ground. Relay 3K now remains energized until such time as the detent switch DS is opened.

When the relay 3K is energized the contacts 3Ka and 3Kb thereof open. Contacts 3Kb which are in series in the energizing circuit for all of the binary relays 1R through NR now deenergizes all of these relays. The contact 3Ka in series in the circuit for the coil of relay K also opens insuring that in the remaining portion of the tool drum indexing cycle reenergization of the relay K may not take place.

When the binary relays are deenergized all of the contacts 1R5 through NR5 are open. Opening of these contacts deenergizes the relay 2K which now opens the contacts 2Ka and 2Kb. As will be seen in FIG. 6, however, as the tool drum moves at creep speed out of position BP4 the stop switch moves to "off cam" position closing contacts SS1. Thus, at the time the contacts 2Ka open in the circuit for the coil of the solenoid E7 which energizes the valve V7 the contacts SS1 are closed or, alternatively, if the contacts SS1 are yet not closed there is sufficient time delay in drop-out of relay 2K to prevent opening of contacts 2Ka ahead of closing contacts SS1. In any event slight momentary deenergization of valve V7 is of no real moment and a pause in drum rotation during the creep mode will not interfere with the performance of the system. In "off cam" position contacts SS1 of the stop switch maintain an energizing circuit for the coil of the solenoid of the valve V7 and thus the drum 27 continues moving at creep speed. In binary cam position BP5 the stop switch is again operated by a stop cam. This opens the contacts SS1 and closes contacts SS2. The contacts SS1 now deenergize the valve V7. This switches the inlet pressure port P connected with inlet pressure line PL1 to outlet pressure port A and the line L7. This applies fluid under pressure to the bottom side of the detent piston 45 and drives the detent upwardly. Just prior to the time that the detent engages the indexing recess in the tool drum 27, the line L7c is cut off by the detent piston which stops the hydraulic motor. The timing is such that the hydraulic motor stops when the detent is in position to engage the cooperating recess in the tool drum. This condition is approximately indicated in FIG. 6 showing the detent switch as being operated at such time as the drum moves into drum position DP4 which corresponds to binary cam position BP5.

Assuming now that Part B is to be machined, the pallet PB will be moved into position on the pallet slides 3 on the machine table 2 and clamped as described in connection with the pallet PA. In this situation, as illustrated in FIG. 1, the limit switches LS1b and LS2b are closed. Closure of limit switch LS2b energizes the tape reader TRb. Closure of limit switch LS1b energizes the tape reader selector relay TS. When this relay is energized contacts TS1a are opened and the contacts TS1b are closed. Thus, the tape reader TRb drives the tape distributor TD. Contacts TSa are now opened and contacts TSb are closed in the energizing circuit for the control relay K.

Assuming as in the previous example that a tool in a slot 4 in the tool drum identified with tape reader TRb is to be selected this tool slot will be identified 4b and again a tool slot 4 in the tool drum is identified on the tape. In this circumstance the binary relay NR is again energized. Again referring to the binary cam switch position indicated in FIG. 4 the tool drum occupies a position in binary cam position BP1. As will be seen from FIG. 7, as well as FIG. 4, the cam switch 1S is in "on cam" position and the cam switches 2S and NS are in "off cam" positions. Of the cam switches illustrated the contacts of cam switch 2S1 in conjunction with the now closed contacts NR5 complete an energizing circuit through the contacts TSb and the contacts 3Ka for the coil of relay K across the 24 volt supply circuit indicated. Thus, as described in the example for Part A the control relays operate and the tool drum is rotated. The sequence of control relay operation will not be repeated here, being the same as that earlier described for the machining of Part A.

As the tool drum 27 moves from binary cam position BP1 to binary cam position BP2 the binary cam switch 1S moves to "off cam" position, the binary cam switch 2S moves to "on cam" position and the binary cam switch NS remains in "off cam" position. The energizing circuit for relay K now includes the contacts 1S1 of the binary cam switch 1S so that the relay K is held energized during this interval. The tool drum moves into binary cam position BP3 and the binary cam switch 1S moves to "on cam" position. Thus, both binary cam switches 1S and 2S are in "on cam" position and the binary cam switch remains in "off cam" position.

In this binary cam switch configuration all of the energizing circuits for the relay K through the binary cam switches and the contacts of the binary relays are open and as a consequence the relay K is energized initiating the control relay sequence preparatory to stopping of the tool drum, and again the sequences of the operation of the control relays are the same as described in connection with Part A. In binary cam position BP4 the stop cam SC4 actuates the stop switch SS and at this point the final holding circuit for the valve solenoid E7 is deenergized and the hydraulic valve V7 moves to deenergized position so that the tool drum is stopped and pinned as previously described. It will be noted that the drum 27 has now stopped in binary cam position BP4, drum position DP3, at that tool slot identified 4b (see FIGS. 6 and 7). The tool slot 4a selected by the tape reader TRa results, as earlier described, in stopping of the tool drum in binary cam position BP5 adjacent that tool slot identified 4a, drum position DP4. Thus, the same tool slot number on the tapes for tape readers TRa and TRb selects drum position DP4 for tape reader TRa and selects the binary complement, in this case drum position DP3, for tape reader TRb.

FIG. 4 illustrates an arrangement in which a double contact assembly for simultaneously setting circuits representative of the binary number and its complement is provided on the respective binary relays. Thus, the comparison of the drum position with the binary number or the complement of the binary number is effected by the setting of the tape selector switch for either tape reader TRa or tape reader TRb as described. The double contact assembly may be provided at the binary cam operated switches rather than the binary relays. This arrangement is illustrated in FIG. 8 showing a circuit incorporating only two of the binary circuits rather than three as illustrated in FIG. 4. In FIG. 8 parts corresponding to those illustrated in FIG. 4 bear like reference characters. The binary switches are now divided into two parts, respectively designated 1Sa, 1Sb and 2Sa, 2Sb. These switch sections 1S and 2S, respectively, are operated by the 1 weighted and 2 weighted cams on the drums. Here, again, selection of tape reader TRa or TRb is accomplished by the tape selector relay TS for the purpose of comparing the number or the complement of the number depending upon whether tape reader TRa or TRb is selected. As shown in FIG. 8 cam operated switch 1Sa has contacts 1Sa1 and 1Sa2. Cam operated switch 1Sb which is worked simultaneously with the switch 1Sa has contacts 1Sb1 and 1Sb2. Similarly, cam operated switch 2Sa has contacts 2Sa1 and 2Sa2 and switch 2Sb has contacts 2Sb1 and 2Sb2. It will be noted from this arrangement that while the number of contacts on the binary relays in each instance have been reduced the additional contacts have in effect been transferred to the cam operated switches which are now doubled in number.

A further variation of the relay circuits is depicted in FIG. 9 wherein the binary relays and the cam operated binary switches each involve only contacts for representing the one and zero values of the binary numbers. Switching is now achieved by the tape selector switch TS which interchanges or reverses the connections between the contacts of each binary relay and its associated cam operated switching to again effectively achieve the selection of a drum position in dependence upon a particular binary number or the complement of a binary number depending upon which of tape readers TRa or TRb are selected, respectively. In this arrangement the tape selector switch TS is provided with contacts 2S2a and 2S2b and TS3a and TS3b in the circuits including the contacts of binary relay 1R and with contacts TS4a, TS4b, TS5a and TS5b in the circuits including the contacts of binary relay 2R to reverse the connection of the contacts of each of the binary cam operated switch with the contacts of the respective binary relays. Here, again, the circuit is illustrated for only two binary relays. However, this circuit, as well as the circuit of FIG. 8, may be extended in accordance with the principles discussed with respect to FIG. 4. Otherwise, the circuit is unchanged.

Figure 10:
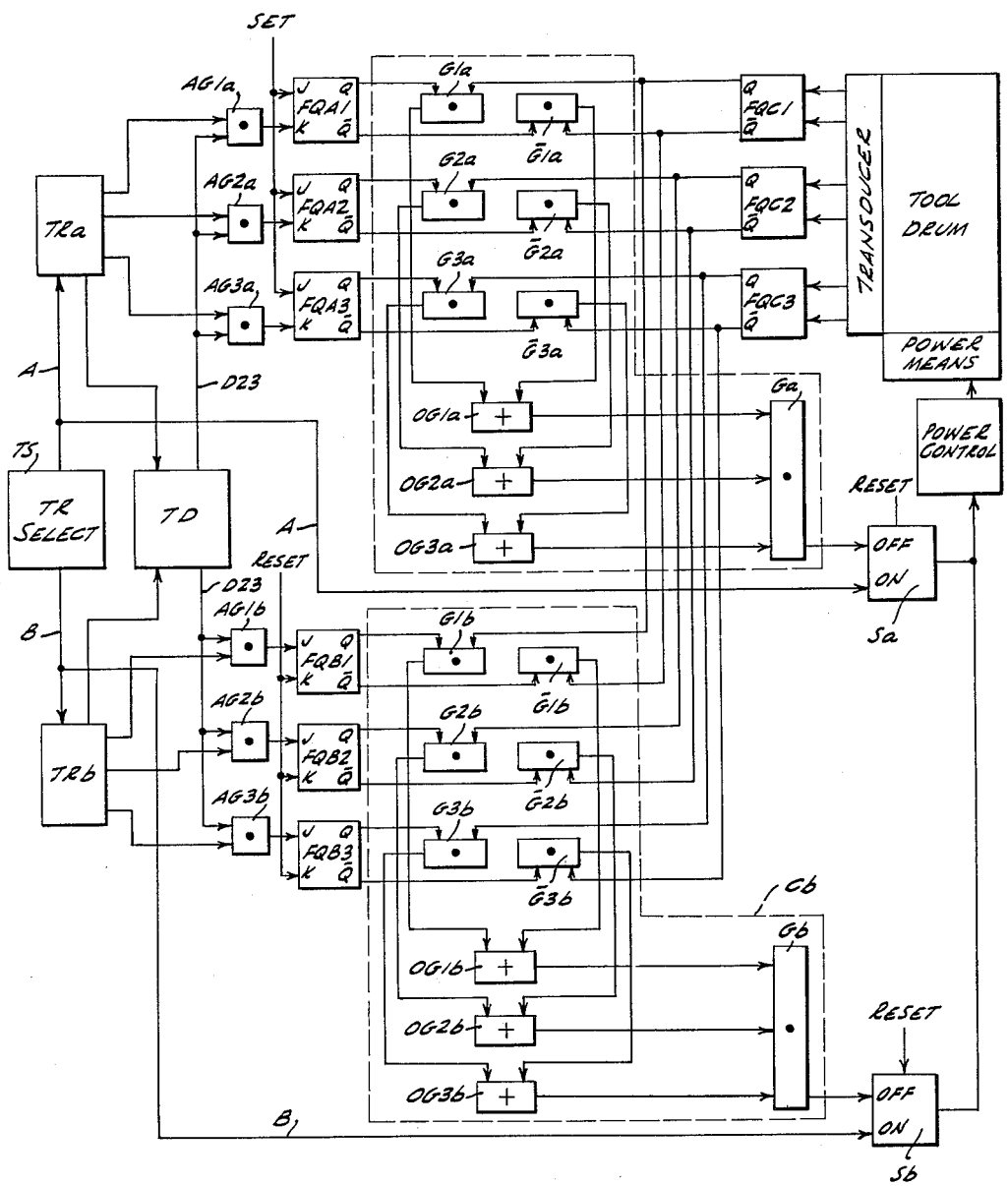

Although the circuits discussed thus far have included relays for storing the binary information which is read from the tape it will be appreciated that other types of arrangements incorporating differing types of components, such as flip-flops and passive gating circuits, are equally feasible. In this connection FIG. 10 depicts an electronic type of circuit employing conventional flip-flops and gating circuits. Flip-flops of the type illustrated in FIG. 10 may be conventional Eccles-Jordon type of flip-flops having two input circuits and two output circuits (see Radiation Laboratory Series "Radar System Engineering," page 499, FIGS. 13–15(a)). The input circuits in each instance are designated J and K representing the "one" setting circuit and the "zero" setting input circuits for the flip-flop, respectively. The output circuits are respectively designated Q and $\bar{Q}$ designating the "one" representing output circuit and the "zero" representing output circuit in each case. Such flip flops, as will be noted from the literature, are bistable in character and upon the application of a suitable input signal to the J input terminal the flip flop is switched to its Q or "one" representing electrical state, and upon the application of a suitable electrical signal to its K input terminal will switch to its $\bar{Q}$ or "zero" representing electrical state.

The arrangement illustrated in FIG. 10 again includes a tape selector, generally designated TS, which may be the same as that illustrated in FIG. 4 and which may be controlled in a similar manner from circuits and switches associated with the shuttle pallet assembly. Here, also, as in FIG. 4 the tape readers TR$a$ and TR$b$ are indicated as being selectively actuated by the tape selector TS. The tape distributor is again shown as a block having only the output D23 represented herein, it being appreciated there may be other electrical outputs as described in connection with FIG. 4. Outputs from the tape readers TR$a$ and TR$b$, respectively, control the tape distributor, as earlier described herein, to step the tape distributor TD in synchronism with the tape reader which has been selected for operation. In this illustration the outputs of tape reader TR$a$ are respectively applied as inputs to respective "and" gates AG1$a$ and AG2$a$, AG3$a$, along with the signal D23 in each instance. Similarly, the outputs of tape reader TR$b$ are applied as inputs to respective "and" gates AG1$b$, AG2$b$, and AG3$b$, along with the electrical output D23 in each instance from the tape distributor TD. As described in connection with FIG. 4, only that tape reader which has been selected for operation will produce electrical outputs. The outputs of "and" gates AG1$a$ through AG3$a$ are applied respectively to the K input terminals of each of a group of flip-flops FQA1, FQA2 and FQA3, the J input terminals of each flip-flop being connected to a common line, herein designated SET, which is utilized to set each of these flip-flops in its Q or "one" representing electrical state prior to the time the tape reader TR$a$ is operated. The output of each of "and" gates AG1$b$ through AG3$b$ is applied to the J input terminals of respective flip-flops FQB1 through FQB3, the K input terminal of each of these flip-flops being connected in common to a circuit designated RESET which is utilized prior to the time tape reader TR$b$ is operated to reset each of the flip flops FQB1 through FQB3 to its $\bar{Q}$ or "zero" representing electrical state.

In the arrangement illustrated, with reference to the tape reader TR$a$, the occurrence of a hole in the tape may be utilized to prevent turning off the associated flip-flop, whereas the absence of a hole in the tape may be utilized to turn off a particular flip-flop, that is, to turn it from its SET or "one" representing electrical state to its $\bar{Q}$ or "zero" representing electrical state. This arrangement, of course, may be reversed to suit the convention which may be adopted. Similar considerations apply to the flip-flops FQB1 through FQB3 which are initially set to "zero" representing electrical states and switched to "one" representing electrical states when a hole is absent on the tape and left in RESET or "zero" representing electrical states with the presence of a hole. Thus, by controlling the SET and RESET connections of the respective flip-flop groups the flip-flops associated with tape reader TR$a$ are set in accordance with the number which is read from the tape and the flip-flops associated with the tape reader TR$b$ are set in accordance with the complement of the number which is read from the tape. Thus, this flip-flop circuit is the equivalent of the binary relay circuit described in connection with FIG. 4.

In this arrangement the tool drum 27 is represented as a block having connected thereto a suitable block designated P which represents a suitable power means, such as the hydraulic motor discussed hereinabove. The power means in turn is connected to and controlled by a suitable power control PC which may be a hydraulic valve system of the type discussed in connection with FIG. 4 and similarly controlled.

Associated with the tool drum 27 in this illustration is a transducer T which may be of any suitable type, such as a switch-operated variety described hereinabove, a suitable photoelectric type, etc., which produces output signals for setting a group of flip-flops FQC1 through FQC3, in accordance with the associated sections of the transducer. Thus, for instance, as the least significant section of the transducer passes the respective index positions on the drum the signal applied to the flip-flop FQC1, which is the least significant flip-flop, switches this flip-flop between its Q and $\bar{Q}$ electrical states. The pattern of switching of these flip-flops for the purposes of this discussion follows exactly the pattern of the switching of the cam switches of FIG. 4.

A first comparator circuit C$a$ comprising "and" gates AG1$a$ through AG3$a$ and "and" gates $\bar{G}$1$a$ through $\bar{G}$3$a$ are utilized to compare the Q and $\bar{Q}$ electrical outputs of the correspondingly weighted flip-flops as indicated. Thus, "and" gate G1$a$ compares the Q electrical output of the FQA1 with the Q electrical output of the FQC1 flip-flop and produces an electrical output when both of these flip-flops are in their Q or "one" representing electrical states. In a similar manner, the "and" gate $\bar{G}$1$a$ compares the $\bar{Q}$ electrical outputs of these outputs and produces an electrical output signal at such time as these flip-flops are shown in their $\bar{Q}$ or "zero" representing electrical states. The electrical outputs of "and" gates G1$a$ and $\bar{G}$1$a$ are applied as inputs to a two-input "or" gate, generally designated OG1$a$. This "or" gate will produce an electrical output in response to an input from either of the connected "and" gates. The remaining "and" gates are similarly connected to compare the Q and $\bar{Q}$ electrical outputs of the correspondingly weighted flip-flops and the outputs of each pair of "and" gates are applied as inputs to the remaining "or" gates, respectively designated OG2$a$ and OG3$a$.

A condition of coincidence of electrical outputs between the flip-flops which are set by the tape reader and the flip-flops which are set by the transducer is indicated by simultaneous electrical outputs from all three of the "or" gates indicated. These are therefore applied as inputs to the output gate of this comparator circuit. This output gate is an "and" gate, generally designated G$a$.

The comparator circuit C$b$ associated with the flip-flops of the tape reader TR$b$ is of similar configuration. The reference characters identifying the "and" gates in this group all bear the suffix "$b$" and indicate that the gates of this comparator are associated with the tape reader TR$b$. The electrical outputs of the transducer operated flip-flops FQC1 through FQC3 are correspondingly connected as inputs to the respective "and" gates of this second comparator. The output "and" gate of this second comparator, designated G$b$ corresponds to that designated G$a$ for the first comparator.

A switch Sa, which may be a flip-flop, has a terminal designated "Off" connected to the output of the "and" gate Ga. A reset signal may be applied to this switch Sa to set this switch to its "Off" position as a normal procedure prior to operation of the system. A switch Sb, which may also be a flip-flop, has an "Off" input terminal similarly connected to the output terminal of the "and" gate Gb. Here, also, this switch will normally be reset so that it is off prior to operation of the system. Each of the switches Sa and Sb has an "On" input terminal. These are respectively connected to the tape selector TS so that the switch Sa is turned on at such time as the tape reader TRa is selected, and the switch Sb is turned on at such time as the tape reader TRb is selected. By this expedient the power control may be set in operation by either of the selected switches to operate the tool drum as described hereinabove in connection with FIG. 4 and continue in such operation until such time as coincidence is achieved as indicated by output of the associated "and" gate Ga or Gb to turn off that switch which is operating and so stop the tool drum in the selected indexed position for tool selection purposes.

The "and" and "or" gates described herein may be of the diode type illustrated in Patent No. 2,803,401.

Figure 11:
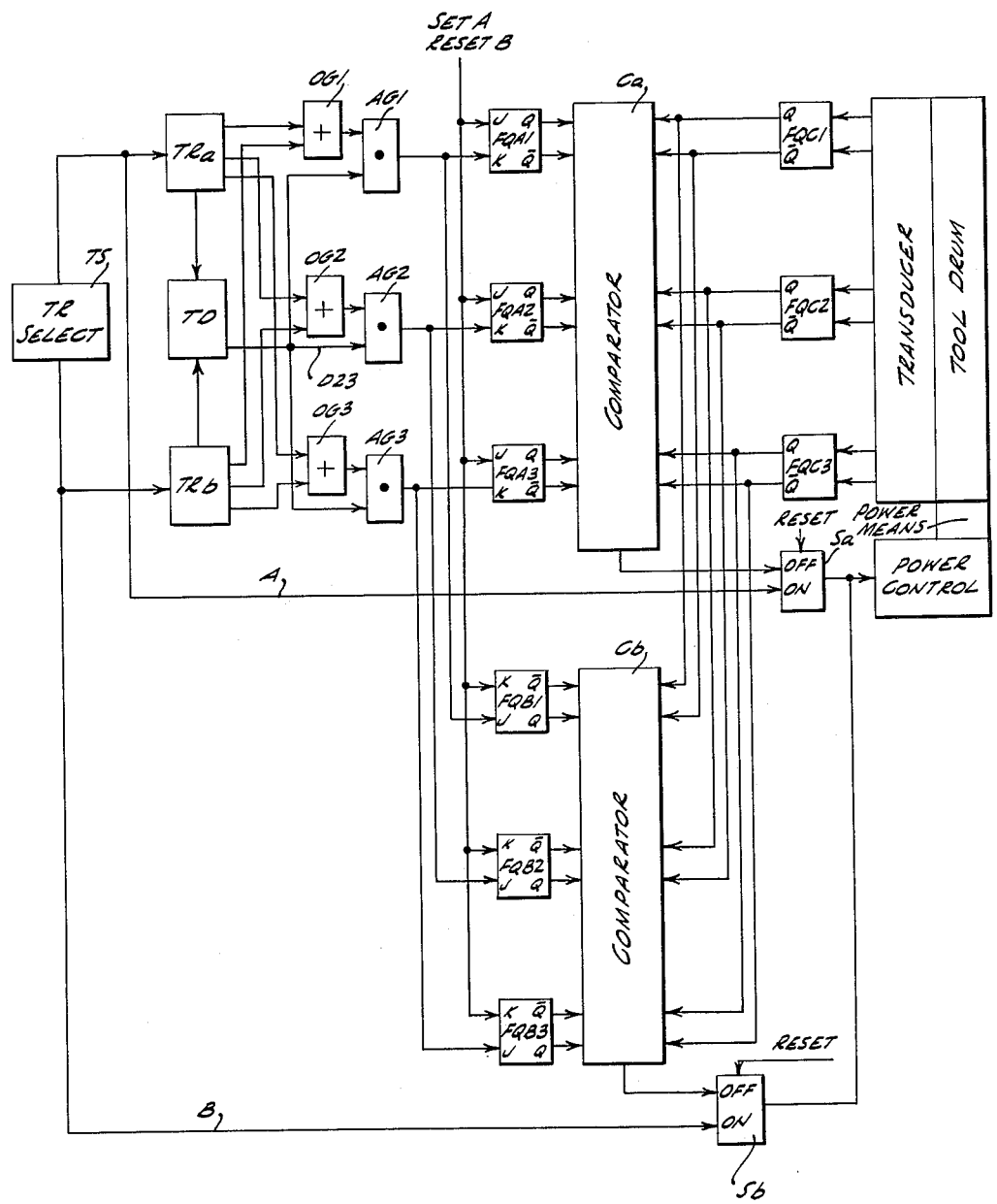

A modification of the circuit of FIG. 10 is illustrated in FIG. 11. Here, the comparators are generally designated as blocks Ca and Cb, the details here being the same as illustrated in connection with FIG. 10. In this figure other parts corresponding to those of FIG. 10 bear like reference characters. A simplification of the gating arrangement is illustrated in FIG. 11 to provide a single gating network for setting the flip-flops of both of the flip-flop groups FQA1 through FQA3 and FQB1 through FQB3, respectively. The tape selector TS, the tape readers TRa and TRb and the tape distributor TD are similar to those described in connection with FIG. 10 and in connection with FIG. 4.

FIG. 11 shows a plurality of "and" gates AG1 through AG3, each having a single output circuit directly connected to the respective K input terminals of the flip flops FQA1 through FQA3, and further connected respectively to the J input terminals of the flip flops FQB1 through FQB3. In this illustration, differing from FIG. 10, a different but equivalent arrangement for pre-setting the flip-flops is shown in the form of a common circuit connected to the J input terminals of flip-flops FQA1 through FQA3 and the K input terminals of flip-flops FQB1 through FQB3. The application of a signal to this set-reset circuit therefore switches all of the flip-flops FQA1 through FQA3 to their Q or "one" representing electrical states, and the flip-flops FQB1 through FQB3 to their $\overline{Q}$ or "zero" representing electrical states. As in the case of FIG. 10 the presence of a hole in the tape associated with a particular one of the flip-flops of the group FQA1 through FQA3 is instrumental in preventing switching of this flip-flop from its "one" representing electrical state and the absence of a hole in the tape is effective to cause switching of the flip-flop from its "one" representing to its "zero" representing electrical state. The reverse is true in connection with the flip-flops FQB1 through FQB3 so that the complement of the number identified on the tape is represented by the setting thereof.

Each of the "and" gates AG1 through AG3 has two input terminals. One input terminal receives the output of a respective one of "or" gates OG1 through OG3, each also having two input terminals. The remaining input terminals of each of the "and" gates is controlled by the output D23 of the tape distributor TD indicating that position of the tape distributor at which these "and" gates are enabled for the purpose of setting the associated flip-flops. The respective input circuits of each of the "or" gates are coupled to the correspondingly weighted outputs of the respective tape readers TRa and TRb. Thus, regardless of which of the tape readers is being used the "and" gates AG1 through AG3 will be effective to provide output signals which are applied to the input circuits of both of the flip-flop groups indicated. Since both of the flip-flop groups are enabled in accordance with the setting of a single one of the tape readers, regardless of which of the tape readers is being operated, reliance for selection of control of the power circuits and power means for moving the drum is placed exclusively upon the selection circuits of the tape selector TS used in selecting the particular one of the tape readers TRa and TRb. Thus, while both of the flip-flop groups have inputs applied to the respective comparator circuits only one of the comparator circuits will be effective to control the operation of the tool drum and it will be that comparator which is associated with the operative tape reader.

The respective switches Sa and Sb of FIG. 11 are the same as those of FIG. 10 and are switched to "off" position by the output of the respective comparators Ca and Cb upon the occurrence of the selected tool drum position and are each switched to their own positions by the output of the tape selector TS selecting a particular one of the tape readers, as previously described. The remaining portion of this system is the same and will be understood from a description of FIG. 10 and from the explanations of the power control circuits and the power circuits with respect to FIG. 4.

FIG. 12 is a further modification of the arrangement of FIG. 11. Here, parts corresponding to those of FIG. 11 bear like reference characters. The gating circuits coupling the tape readers to the respective flip-flops which are set in accordance with the information read from the tape in FIG. 12 are the same as those of FIG. 11 and no further description thereof need be made. The control of this circuit, however, is such that the "b" group of flip-flops shown in both of FIGS. 10 and 11 may be eliminated. In this illustration therefore only a single set of flip-flops FQ1 through FQ3, responsive to information read from the tape, is herein illustrated. As before, a SET signal is applied to the J input terminals of all of these flip-flops and the K input terminal of each flip flop is controlled, respectively, by the output of the associated one of the "and" gate AG1 through AG3. Only a single comparator circuit, here designated Ca, is required. In this circuit mechanical switching of the inputs of the flip-flops FQC1 through FQC3 to the inputs of the respective "and" gates is accomplished by means of a reversing switch, here designated TSS, and indicated as a relay having reversing contacts in each of the output circuits of the respective flip flops FQC1 through FQC3. This relay is normally deenergized and connects the Q and $\overline{Q}$ output terminals of the respective transducer controlled flip-flops to the "and" gates to compare the Q and $\overline{Q}$ outputs of this group of flip-flops with the Q and $\overline{Q}$ outputs of the flip-flops FQ1 through FQ3. At such time as tape reader TRb is selected the reversing switch TSS is energized and switches the Q and $\overline{Q}$ inputs to the "and" gates of the comparator Ca so that the Q output of the flip-flop FQC1, for instance, is compared with the $\overline{Q}$ output of the flip-flop FQ1, etc., for all of the flip-flops indicated to provide a comparison and a final setting of the tool drum in accordance with the complement of the setting of the flip-flops FQ1 through FQ3 to control of the tape. Thus, this control is of the same character and is the equivalent of the control described in connection with FIG. 4. Here, again, a switch Sa, which may be a flip-flop, has an "Off" input terminal controlled by the output of the comparator Ca and has an "On" input terminal which is connected to the tape selector TS and is operated every time one of the tape readers TRa or TRb is selected.

FIG. 13 illustrates a detail variation of the circuit of FIG. 12. In this instance, the reversing switch TSS is eliminated and a plurality of "and" gates substituted therefor. In this illustration "and" gates AG5 and AG6 couple the Q and $\overline{Q}$ output circuits, respectively, of the flip-flop FQC1 to the "and" gates of the comparator circuit Ca so that a comparison with the Q and $\bar{Q}$ electrical outputs, respectively, of the flip flop FQ1 may be made. "And" gates AG7 and AG8 are effective to reverse this connection, as indicated, so that the comparison of the complements may be achieved as described hereinabove. This figure also illustrates the use of a cam operated switch 1S in controlling the input to the flip-flop. Such a cam switch may be the same as that illustrated in connection with FIG. 4, for instance. It will be appreciated in this connection that suitable electronic devices may be coupled between this cam switch and the input to the flip-flop. This circuit may be extended to include the remaining flip-flops FQC2 and FQC3, as well as any additional flip-flops that may be required to provide the order of binary representation of the several positions as is required. The "and" gates AG5 and AG6 are controlled by a circuit, generally designated A. This circuit is coupled to the tape selector TS so that an enabling signal is applied simultaneously to "and" gates AG5 and AG6 at the time that the tape reader TRa is selected. The circuit B is similarly coupled to the tape selector TS and has outputs connected to the "and" gates AG7 and AG8 to enable these "and" gates at such time as the tape selector is operated to select the tape reader TRb. The operation of this circuit in the system will be understood in connection with the explanations which have been made hereinabove.

Although the operation of this system has been described in connection with a three bit binary coding system involving three binary relays and three cam switches, it will be appreciated that the system is not limited to any particular number of relays but may be extended, as FIG. 4 illustrates, within practical limits to include as many binary relays and cam switches as may be required to indicate the number of positions required. In this connection, depending upon the number of bit positions identified in each row of information on the tape, it may be expedient to read more than one row of information from the tape for the purpose of identifying a particular angular position (or linear position) where the number of such positions is high. In this case more than one tape distributor circuit may be employed for enabling selected gates of a gating matrix controlling the relay drivers. For instance, a circuit D23 from the tape distributor may be used to energize a first group of, say three or four, relay drivers corresponding in number to the number of information bits contained in row 23 of the tape, and a second tape distributor output circuit, say D24 (not illustrated), may be utilized to energize a second group of relay drivers, again corresponding in number to the number of bit positions in row 24 of the tape. These and other equally obvious expedients may be employed in transferring information from the selected one of the two tape readers to the relay drivers and binary relays.

Although binary decimal coding has been referred to herein, it will be appreciated that any type of binary code may be employed. In one practical embodiment of this invention a binary octal system was utilized in which respective groups of relay drivers, binary relays and binary cam switches, each capable of storing five binary bit positions, was employed. The weighting of these relays was 1, 2, 4, 10 and 20 and provided sufficient capacity for identifying 30 tool slots in a drum of the character illustrated, for instance, in FIG. 1. In this arrangement a first row of information on the tape was read and the signals therefrom coupled through gating of the character illustrated herein to each of the 10 and 20 weighted relay drivers and thereafter a second row of information from the tape was read and coupled into each of the 1, 2 and 4 weighted relay driver circuits, again through gating of the character illustrated herein. In this arrangement as in the modification suggested immediately above two separate output circts of the tape disrtibutor TD were employed, one associated with information gating to the 10 and 20 weighted relay drivers and the other associated with information gated to the 1, 2 and 4 weighted relay drivers. Other coding systems will be readily apparent to those skilled in the art.

Although a machine tool control has been illustrated herein utilizing a dual spindle assembly wherein one tool in a tool exchanging position may be unloaded and reloaded during a machining operation being performed by the other tool spindle, it will be appreciated that an arrangement involving only a single spindle may be employed, in which case the tool drum and the tool handling mechanism will be positioned to effect interchange between a tool normally disposed in some operating position. Arrangements of this type are conventional and are not described herein in the interest of simplicity.

What is claimed is:
1. A machine control, comprising:
   a movable member;
   power means coupled to said movable member to move said movable member;
   power control means coupled to said power means to control said power means;
   discrete signal, position indicator means coupled to and operated by said movable member;
   a pair of discrete signal program devices;
   circuit means interconnecting one program device and said position indicator means in one sense and having an output circuit coupled to said power control means to control said movable member in accordance with the discrete signals of said one program device;
   circuit means interconnecting the other of said program devices and said position indicator means in a different sense from the interconnection of said one program device and said position indicator means and having an output circuit coupled to said power control means to control said movable member in accordance with a predetermined modification of the discrete signals of said other program device;
   and selector means coupled to said program devices for selectively operating said program devices.

2. A machine control, comprising:
   a movable member;
   power means coupled to said movable member to move said movable member;
   power control means coupled to said power means to control said power means;
   binary signal, position indicator means coupled to and operated by said movable member;
   a pair of binary signal program devices;
   circuit means interconnecting one program device and said position indicator means and coupled to said power control means to control said movable member in accordance with the binary signals of said one program device;
   circuit means interconnecting the other of said program devices and said position indicator means and coupled to said power control means to control said movable member in accordance with the complements of the binary signals of said other of said program devices;
   and selector means coupled to said binary signal program devices for selectively operating said program devices.

3. A machine control, comprising:
   a movable member;
   power means coupled to said movable member to drive said movable member;
   power control means coupled to said power means for moving said movable member;
   binary signal, position indicator means coupled to and operated by said movable member;
   a pair of binary signal, program devices;
   selector means coupled to said program devices to selectively operate said program devices;

coincidence circuit means coupling one program device to said position indicator means to produce a coincidence indication when said binary signals of said position indicator correspond to the binary signals of said program device;

coincidence circuit means coupling the other of said program devices to said position indicator means to produce a coincidence indication when said binary signals of said position indicator means correspond to the complement of the binary signals of said program device;

and means coupled to and controlled by said selector means and coupled to both of said coincidence circuit means and said power control means for selectively coupling said coincidence circuit means to said power control means.

4. A machine control, comprising:

a movable member;

power means coupled to said movable member to drive said movable member;

a binary signal, position indicator coupled to and operated by said movable member and having a group of binary position signal output circuits;

a pair of binary signal program devices, each having a group of binary signal output circuits;

selector means coupled to said program devices to selectively render said program devices operative;

coincidence circuit means coupling the output circuit group of one of said program devices to said output circuit group of said position indicator to compare the output signals of said output circuit groups;

coincidence circuit means coupling the output circuit group of the other of said program devices to said output circuit group of said position indicator to compare the complements of the binary signals of one output circuit group with the binary signals of the other output circuit group;

and power control means coupling both of said coincidence circuit means to said power means to control said power means.

5. A machine tool control, comprising:

a machine tool having an indexable tool magazine;

power means coupled to said tool magazine for moving said tool magazine;

power control means coupled to said power means for controlling movement of said tool magazine;

a coded-signal position indicator coupled to and operated by said tool magazine and having a plurality of position signal output circuits;

storage circuit means having a plurality of input circuits and having a plurality of output circuits;

a pair of coded-signal program devices, each having a plurality of output circuits coupled to said input circuits of said storage circuit means to set said storage circuit means;

selector circuit means coupled to and selectively operating said program devices;

circuit means coupled to and controlled by said selector means and coupling said output circuits of said storage means and said position indicator in a first sense when one of said program devices is operating, and coupling said output circuits of said storage means and said position indicator in a different sense when the other of said program devices is operative;

and means coupling said circuit means to said power control means.

6. A machine tool control, comprising:

a machine tool having an indexable tool magazine;

power means coupled to said tool magazine for moving said tool magazine;

power control means coupled to said power means for controlling movement of said tool magazine;

a binary-coded position indicator coupled to and operated by said tool magazine and having a plurality of binary signal output circuits and binary complement signal output circuits;

storage circuit means having a plurality of input circuits and having a plurality of output circuits;

a pair of binary signal program devices, each having a plurality of output circuits coupled to said input circuits of said storage circuit means to set said storage circuit means;

selector circuit means coupled to and selectively operating said program devices;

circuit means coupled to and controlled by said selector means and coupling said output circuits of said storage means and said position indicator in a first sense to compare the signals of said storage means with the signals of said position indicator, and coupling said output circuits of said storage means and said position indicator in a different sense to compare said signals of said storage means with said complement signals of said position indicator when the other of said program devices is operative;

and means coupling said circuit means to said power control means.

7. A machine tool control, comprising:

a machine tool having an indexable tool magazine;

power means coupled to said tool magazine for moving said tool magazine;

power control means coupled to said power means for controlling movement of said tool magazine;

binary-coded position indicator means coupled to and operated by said tool magazine and having a plurality of position signal output circuits;

a pair of binary-coded program devices, each having a plurality of output circuits;

circuit means coupled to and controlled by said output circuits of said position indicator means and said program devices and coupled to and controlling said power control means to move and position said tool magazine in accordance with the binary code of one of said pair of program devices and in accordance with the complement of the binary code of the other of said pair of program devices;

and means connected to and selectively operating said program devices.

8. A machine tool control, comprising:

a machine tool having an indexable tool magazine;

power means coupled to said tool magazine for moving said tool magazine;

power control means coupled to said power means for controlling movement of said tool magazine;

binary-coded position indicator means coupled to and operated by said tool magazine and having a plurality of position signal output circuits;

a pair of binary-coded program devices, each having a plurality of output circuits;

selector means coupled to both of said program devices for selectively operating said program devices;

comparator circuit means coupled to said output circuits of both of said program devices and said position indicator and having an output coupled to and controlling said power control means;

and control circuit means coupled to said selector means and to said comparator circuit means for controlling said comparator circuit means to provide inputs to said power control means to move and position said tool magazine in accordance with the binary code of one of said program devices and in accordance with the complement of the binary code of the other of said program devices.

9. A machine tool control, comprising:

a machine tool having an indexable tool magazine and having a shuttle table movable between two positions;

power means coupled to said tool magazine for moving said tool magazine;

power control means coupled to said power means for controlling movement of said tool magazine;
binary-coded position indicator means coupled to and operated by said tool magazine and having a plurality of position signal output circuits;
a pair of binary-coded program devices, each having a plurality of output circuits;
circuit means coupled to and controlled by said output circuits of said position indicator means and said program devices and coupled to and controlling said power control means to move and position said tool magazine in accordance with the binary code of one of said pair of program devices and in accordance with the complement of the binary code of the other of said pair of program devices;
and circuit means connected to and controlled by said shuttle table and connected to said pair of program devices for operating one program device in one position of said shuttle table and operating the other program device in the other position of said shuttle table.

10. A machine tool control, comprising:
a machine tool having an indexable tool magazine;
power means coupled to said tool magazine for moving said tool magazine;
power control means coupled to said power means for controlling movement of said tool magazine;
binary-coded position indicator means coupled to and operated by said tool magazine and having a plurality of position signal output circuits;
a pair of binary-coded program devices, each having a plurality of output circuits;
first circuit means coupling said output circuits of said position indicator means with said output circuits of one of said pair of program devices in a sense to provide a direct comparison of the binary code of said position indicator means with the binary code of said one of said pair of program devices;
second circuit means coupling said output circuits of said position indicator means with said output circuits of the other of said pair of program devices in a sense to provide a comparison of the binary code of said position indicator means with the complement of the binary code of said other of said pair of program devices;
means coupling said first and said second circuit means to said power control means to operate said power control means;
and selector means coupled to both of said program devices for selectively operating said program devices.

11. Apparatus as set forth in claim 10 and, in addition, a control circuit coupled to and controlled by said selector means and coupled to both of said first and said second circuit means for selectively enabling the control of said power control means by said first and said second circuit means.

12. Apparatus as set forth in claim 10 and, in addition, a relay having a coil connected to said selector means and having contacts in each of said first and said second circuit means.

13. Apparatus as set forth in claim 10 and, in addition, logical gating circuits in each of said first and said second circuit means and having input circuits coupled to said selector means.

14. Apparatus as set forth in claim 10 wherein said means coupling said first and said second circuit means to said power control means comprises a switch connected to and controlled by said selector means.

15. Apparatus as set forth in claim 10 wherein said means coupling said first and said second circuit means to said power control means comprises a first switch coupled to and controlled by said first circuit means and said selector means, and a second switch coupled to and controlled by said second circuit means and said selector means.

References Cited by the Examiner
UNITED STATES PATENTS

| | | | |
|---|---|---|---|
| 3,052,011 | 9/1962 | Brainard | 29—26 |
| 3,099,873 | 8/1963 | Brainard | 29—26 |

FOREIGN PATENTS

| | | |
|---|---|---|
| 1,242,438 | 8/1960 | France. |

RICHARD H. EANES, JR., *Primary Examiner.*